US012101298B2

United States Patent
Seo et al.

(10) Patent No.: US 12,101,298 B2
(45) Date of Patent: Sep. 24, 2024

(54) ELECTRONIC DEVICE, METHOD, AND COMPUTER READABLE STORAGE MEDIUM FOR COMMUNICATING THROUGH VIRTUAL PRIVATE NETWORK

(71) Applicant: SAMSUNG ELECTRONICS CO., LTD., Suwon-si (KR)

(72) Inventors: Dongwon Seo, Suwon-si (KR); Seonghan Park, Suwon-si (KR); Jaehoon Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 273 days.

(21) Appl. No.: 17/847,966

(22) Filed: Jun. 23, 2022

(65) Prior Publication Data

US 2023/0085507 A1    Mar. 16, 2023

Related U.S. Application Data

(63) Continuation of application No. PCT/KR2022/008341, filed on Jun. 14, 2022.

(30) Foreign Application Priority Data

Sep. 15, 2021    (KR) .................. 10-2021-0123532

(51) Int. Cl.
*H04L 9/40* (2022.01)
*H04W 12/63* (2021.01)
*H04W 12/71* (2021.01)

(52) U.S. Cl.
CPC ......... *H04L 63/0272* (2013.01); *H04W 12/63* (2021.01); *H04W 12/71* (2021.01)

(58) Field of Classification Search
CPC .... H04W 12/71; H04W 12/63; H04L 63/0272

(Continued)

(56) References Cited

U.S. PATENT DOCUMENTS 7,209,494 B1 * 4/2007 Griffin ................. H04B 1/7085
370/503
7,589,614 B2 * 9/2009 Xydis ..................... G01S 13/76
726/16

(Continued)

FOREIGN PATENT DOCUMENTS

CN    103945533 A    7/2014
CN    104378768 A    2/2015

(Continued)

OTHER PUBLICATIONS

International Search Report with Written Opinion issued in International Application No. PCT/KR2022/008341; International Filing Date Jun. 14, 2022; Date of Mailing Oct. 4, 2022 (11 pages).

*Primary Examiner* — Amare F Tabor
(74) *Attorney, Agent, or Firm* — CANTOR COLBURN LLP

(57) ABSTRACT

An electronic device according to an embodiment includes a memory storing instructions, a global positioning system (GPS) receiver, a communication circuit, and a processor. The processor, when executing the instructions, is configured to establish a connection with a public access point (AP) to communicate with an external electronic device, obtain location information of the electronic device, maintain a state of mode for a VPN in an inactive state, based on transmitting information distinct from the location information, on a condition that the number of a plurality of electronic devices located within a reference distance from the public AP is less than a reference value, and switch the state of mode for VPN mode from the inactive state to an active state, based on transmitting the information on a condition that the number of the plurality of electronic devices is equal to or greater than the reference value.

20 Claims, 22 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 8,040,898 B2* | 10/2011 | Takizawa | .......... | H04W 74/0875 370/395.42 |
| 8,169,991 B2* | 5/2012 | Vesuna | ................ | H04W 64/00 370/348 |
| 8,265,702 B2* | 9/2012 | Iacono | ................ | H04W 16/28 455/562.1 |
| 8,295,255 B2* | 10/2012 | Nakano | ................... | H04K 3/65 370/338 |
| 8,570,942 B2* | 10/2013 | Iwata | ................... | H04W 48/16 370/328 |
| 9,082,077 B2 | 7/2015 | Petersen et al. | | |
| 9,198,212 B2* | 11/2015 | Yee | ...................... | H04W 76/14 |
| 9,544,849 B2* | 1/2017 | Choi | ................. | H04W 52/0229 |
| 9,602,174 B2* | 3/2017 | Choi | ................... | H04B 7/0408 |
| 9,655,038 B2* | 5/2017 | Kapoor | ................ | H04B 17/318 |
| 9,661,659 B2* | 5/2017 | Choi | ................ | H04W 74/0816 |
| 9,980,286 B2* | 5/2018 | Nishimura | .......... | H04W 74/002 |
| 10,345,430 B2* | 7/2019 | Lu | ............................ | G01C 5/06 |
| 10,581,803 B1 | 3/2020 | Chang | | |
| 10,849,091 B1 | 11/2020 | Lange | | |
| 11,160,013 B2* | 10/2021 | Choi | ..................... | H04W 48/20 |
| 11,219,058 B2* | 1/2022 | Kwon | ................... | H04W 74/08 |
| 11,477,699 B2* | 10/2022 | Asterjadhi | .......... | H04W 72/044 |
| 2010/0027462 A1* | 2/2010 | Lee | ...................... | H04B 7/2681 370/328 |
| 2019/0081751 A1* | 3/2019 | Miao | ................... | H04L 25/0224 |
| 2020/0076552 A1* | 3/2020 | Cherian | ................ | H04B 7/024 |
| 2020/0280541 A1 | 9/2020 | Walker | | |
| 2020/0358651 A1 | 11/2020 | Brandwine et al. | | |
| 2021/0083784 A1* | 3/2021 | Chae | ....................... | H04W 4/80 |
| 2021/0127431 A1 | 4/2021 | Kim et al. | | |
| 2022/0116858 A1* | 4/2022 | Sugaya | .................. | H04W 48/08 |
| 2022/0418025 A1 | 12/2022 | Kim et al. | | |
| 2023/0140667 A1* | 5/2023 | Nagao | ............. | G06K 19/07749 340/10.1 |

FOREIGN PATENT DOCUMENTS

| | | |
|---|---|---|
| KR | 20210050398 A | 5/2021 |
| KR | 20210111539 A | 9/2021 |

\* cited by examiner

ELECTRONIC DEVICE, METHOD, AND COMPUTER READABLE STORAGE MEDIUM FOR COMMUNICATING THROUGH VIRTUAL PRIVATE NETWORK

CROSS-REFERENCE TO RELATED APPLICATION(S)

This application is a continuation application, claiming priority under § 365(c), of an International Application No. PCT/KR2022/008341, filed on Jun. 14, 2022, which is based on and claims the benefit of a Korean patent application number 10-2021-0123532, filed on Sep. 15, 2021, in the Korean Intellectual Property Office, the disclosure of which is incorporated by reference herein in its entirety.

BACKGROUND

Technical Field

This disclosure relates generally to an electronic device, method, and computer-readable storage medium for communicating through a virtual private network (VPN).

Description of Related Art

A virtual private network (VPN) may be a solution being utilized for site-to-site encrypted communications or end-to-end encrypted communications. A VPN may be used as a solution to protect untrusted wireless networks in a mobile environment. For example, a VPN may be used as a traffic encryption technology such as voice over Wi-Fi (VoWiFi) or mobile device management (MDM). A VPN may be used with a view to protecting electronic devices when communicating in case where there is expected a possible threat of network hacking.

SUMMARY

An electronic device may establish a connection with a first type of access point (AP) commonly used from a plurality of electronic devices of a number of unspecified users or a second type of access point (AP) for an individual or a specified group of users.

The electronic device may, as opposed to communicating with an external electronic device through a connection with the second type of AP, utilize a VPN to enhance the security of communication through a connection with the first type of AP while communicating with the external electronic device through a connection with the first type of AP. The electronic device may identify a type of the AP which it has accessed to utilize the VPN.

The technical problems to be achieved in this document are not limited to those described above, and other technical problems not mentioned herein will be clearly understood by those having ordinary knowledge in the art to which the present disclosure belongs, from the following description.

An electronic device according to an embodiment may include a memory configured to store instructions, a global positioning system (GPS) receiver, at least one communication circuit, and a processor. The processor, when executing the instructions, may be configured to establish connection with an access point (AP) using the at least one communication circuit, obtain location information of the electronic device using the GPS receiver in response to establishing the connection with the AP, transmit, to a server for a virtual private network (VPN), a first signal obtained based at least in part on the location information of the electronic device and identification information of the AP using the at least one communication circuit, receive a second signal or a third signal from the server receiving a plurality of signals within a predetermined time interval from each of the plurality of electronic devices including the electronic device, the plurality of signals including the first signal and obtained respectively based at least in part on the location information of each of the plurality of electronic devices and the identification information of the AP communicate with an external electronic device through the AP or the server based on receiving the second signal, and communicate with the external electronic device through both the AP and the server based on the receiving of the third signal, wherein the second signal may be transmitted from the server to the electronic device on a condition that the number of the plurality of signals received by the server within a predetermined time interval is less than a predetermined number, and wherein the third signal may be transmitted from the server to the electronic device on a condition that the number of the plurality of signals received by the server within the predetermined time interval is greater than the predetermined number.

An electronic device according to an embodiment may include a memory configured to store instructions, a global positioning system (GPS) receiver, a communication circuit, and a processor operatively coupled with the memory and the communication circuitry. The processor may, when executing the instructions, be configured to establish connection with a public AP to communicate with an external electronic device, obtain location information of the electronic device by using the GPS receiver, maintain a state of mode for a VPN in an inactive state in response to establishing the connection with the public AP based at least in part on transmitting information obtained based at least in part on the location information and distinct from the location information in a state in which the number of a plurality of electronic devices, including the electronic device, located within a reference distance from the public AP is less than a reference value, and switch the state of a mode for a VPN mode from the inactive state to an active state based at least in part on transmitting the information in a state that the number of the plurality of electronic devices is equal to or greater than the reference value.

A server according to one embodiment may include a memory configured to store instructions, a communication circuit, and a processor operatively coupled with the communication circuitry. The processor may, when executing the instructions, be configured to receive, from each of a plurality of electronic devices, a plurality of signals obtained based at least in part on location information of each of the plurality of electronic devices and identification information of an access point (AP) in the plurality of electronic devices within a predetermined time interval, transmit a first signal for setting the plurality of electronic devices to communicate with an external electronic device through the AP or the server to the plurality to electronic devices based on identifying that the number of the plurality of signals received within the predetermined time interval is less than a predetermined number, and transmit a second signal for setting the plurality of electronic devices to communicate with an external electronic device through both of the AP and the server to the plurality to electronic devices based on identifying that the number of the plurality of signals received within the predetermined time interval is greater than the predetermined number.

A computer readable storage medium storing one or more programs according to an embodiment may cause, when executed by a processor of an electronic device, the electronic device to establish using the at least one communication circuit, connection with an access point (AP), obtain location information of the electronic device using a GPS receiver in response to establishing the connection with the AP, transmit, to a server for a virtual private network (VPN), a first signal obtained based at least in part on the location information of the electronic device and identification information of the AP, receive a second signal or a third signal from the server receiving a plurality of signals within predetermined time interval from each of the plurality of electronic devices including the electronic device, wherein the plurality of signals includes the first signal and is obtained respectively based at least part on location information of each of the plurality of electronic devices and identification information of the AP, communicate with an external electronic device through the AP or the server based on the receiving of the second signal, and communicate with the external electronic device through both the AP and the server based on the receiving of the third signal, wherein the second signal may be transmitted from the server to the electronic device on a condition that the number of the plurality of signals received by the server within a predetermined time interval is less than a predetermined number, and wherein the third signal may be transmitted from the server to the electronic device on a condition that the number of the plurality of signals received by the server within the predetermined time interval is greater than the predetermined number.

A computer readable storage medium storing one or more programs according to an embodiment may cause, when executed by a processor of a server for VPN, the server to receive, from each of a plurality of electronic devices, a plurality of signals each obtained based at least in part on location information of each of the plurality of electronic devices and identification information of an access point (AP) in the plurality of electronic devices within a predetermined time interval based on identifying that the number of the plurality of signals received within the predetermined time interval is less than a predetermined number, transmit a first signal for setting the plurality of electronic devices to communicate with an external electronic device through the AP or the server to the plurality to electronic devices, and transmit a second signal for setting the plurality of electronic devices to communicate with an external electronic device through both of the AP and the server to the plurality to electronic devices based on identifying that the number of the plurality of signals received within the predetermined time interval is equal to or greater than the predetermined number.

A computer readable storage medium storing one or more programs according to an embodiment may cause, when executed by a processor of an electronic device, the electronic device to establish a connection with a public access point (AP) to communicate with an external electronic device, to obtain location information of the electronic device using the GPS receiver in a state in which the number of a plurality of electronic devices, including the electronic device, located within a reference distance from the public AP is less than a reference value in response to establishing the connection with the public AP, to maintain a state of the mode for the VPN in an inactive state based at least in part on transmitting information obtained based at least in part on the location information and distinct from the location information, and to change the state of the mode for the VPN from the inactive state to an active state based at least in part on transmitting the information in a state in which the number of the plurality of electronic devices is equal to or greater than the reference value.

A method of an electronic device according to an embodiment may include establishing connection with an access point (AP) using at least one communication circuit, obtaining location information of the electronic device using the GPS receiver in response to establishing the connection with the AP, transmitting, to a server for a virtual private network (VPN), a first signal obtained based at least in part on the location information of the electronic device and identification information of the AP using the at least one communication circuit, receiving a second signal or a third signal from the server receiving a plurality of signals within predetermined time interval from each of the plurality of electronic devices, the plurality of signals including the first signal and obtained respectively based at least in part on the location information of each of the plurality of electronic devices including the electronic device and the identification information of the AP, communicating with the external electronic device through the AP or the server based on receiving the second signal, and communicating with the external electronic device through both the AP and the server based on receiving of the third signal, wherein the second signal may be transmitted from the server to the electronic device on a condition that the number of the plurality of signals received by the server within a predetermined time interval is less than a predetermined number, and wherein the third signal may be transmitted from the server to the electronic device on a condition that the number of the plurality of signals received by the server within the predetermined time interval is equal to or greater than the predetermined number.

A method of a server according to an embodiment may include receiving, from each of a plurality of electronic devices, a plurality of signals obtained based at least in part on location information of each of the plurality of electronic devices and identification information of an access point (AP) in the plurality of electronic devices within a predetermined time interval, transmitting a first signal for setting the plurality of electronic devices to communicate with an external electronic device through the AP or the server to the plurality to electronic devices based on identifying that the number of the plurality of signals received within the predetermined time interval is less than a predetermined number, and transmitting a second signal for setting the plurality of electronic devices to communicate with an external electronic device through both of the AP and the server to the plurality to electronic devices based on identifying that the number of the plurality of signals received within the predetermined time interval is greater than the predetermined number.

A method of an electronic device according to an embodiment may include establishing connection with a public AP to communicate with an external electronic device, obtaining location information of the electronic device by using the GPS receiver in response to establishing the connection with the public AP, maintaining a state of mode for a VPN in an inactive state based at least in part on transmitting information obtained based at least in part on the location information and distinct from the location information, in a state in which the number of a plurality of electronic devices, including the electronic device, located within a reference distance from the public AP is less than a reference value, and switching the state of the mode for the VPN mode from the inactive state to an active state based at least in part on transmitting the information in a state that the number of the plurality of electronic devices is equal to or greater than the reference value.

The effects that can be obtained from the present disclosure are not limited to those described above, and any other effects not mentioned herein will be clearly understood by those having ordinary knowledge in the art to which the present disclosure belongs, from the following description.

DESCRIPTION OF THE DRAWINGS

The above and other aspects, features, and advantages of certain embodiments of the disclosure will be more apparent from the following description, taken in conjunction with the accompanying drawings, in which.

DETAILED DESCRIPTION

The electronic device according to an embodiment can acquire a signal based on location information and identification information of the electronic device. Further, the electronic device can identify an access point (AP) required to communicate using a virtual private network (VPN) based on transmitting the obtained signal to the server.

Figure 1:
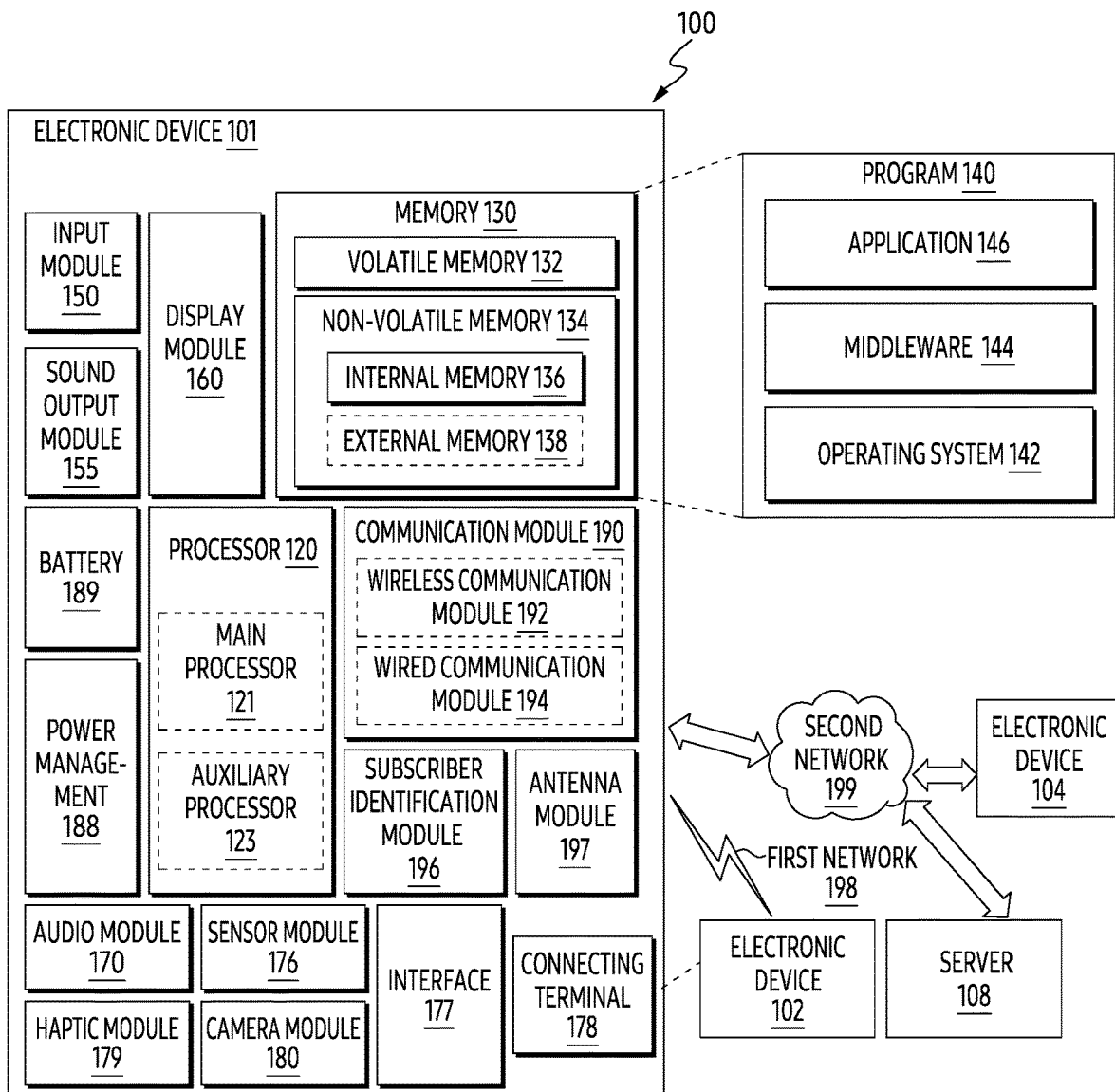
FIG. 1 is a block diagram of an electronic device in a network environment according to various embodiments.

FIG. 1 is a block diagram of an electronic device 101 in a network environment 100 according to various embodiments.

Referring to FIG. 1, in a network environment 100, an electronic device 101 may communicate with an electronic device 102 through a first network 198 (e.g., a local area wireless communication network) or communicate with at least one of an electronic device 104 or a server 108 through a second network 199 (e.g., a wide area wireless communication network). According to one embodiment, the electronic device 101 may communicate with the electronic device 104 through the server 108. According to one embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module 196, or an antenna module 197. In some embodiments, at least one of these components (e.g., the connecting terminal 178) may be omitted from to the electronic device 101 or one or more other components may be added thereto. In some embodiments, some of these components (e.g., the sensor module 176, the camera module 180, or the antenna module 197) may be integrated into one component (e.g., the display module 160).

The processor 120 may, for example, execute software (e.g., a program 140) to control at least one other component (e.g., hardware or software element) of the electronic device 101 connected to the processor 120 and perform various data processing or operation. According to one embodiment, as at least part of data processing or operation, the processor 120 may store instructions or data received from other components (e.g., the sensor module 176 or the communication module 190) into a volatile memory 132, process the instructions or data stored in the volatile memory 132, and store resulting data in a non-volatile memory 134. According to one embodiment, the processor 120 may include a main processor 121 (e.g., a central processing unit or an application processor) or an auxiliary processor 123 (e.g., a graphic processing unit, a neural processing unit (NPU), an image signal processor, a sensor hub processor, or a communication processor) being operable either independently of or in combination with the main processor 121. For example, when the electronic device 101 includes the main processor 121 and the auxiliary processor 123, the auxiliary processor 123 may be set to use less power than the main processor 121 or to be specialized for a certain function. The auxiliary processor 123 may be implemented separately from or as a part of the main processor 121.

The auxiliary processor 123 may, for example, control at least part of the functions or states related to at least one of the components of the electronic device 101 (e.g., the display module 160, the sensor module 176, or the communication module 190), on behalf of the main processor 121 while the main processor 121 is in an inactive state (e.g., a sleeping mode), or in combination with the main processor 121 while the main processor 121 is in an active state (e.g., an application execution mode). According to one embodiment, the auxiliary processor 123 (e.g., the image signal processor or the communication processor) may be implemented as a part of another component (e.g., the camera module 180 or the communication module 190) functionally related thereto. According to one embodiment, the auxiliary processor 123 (e.g., the neural processing unit) may include a hardware structure specialized for processing an artificial intelligence model. The artificial intelligence models may be created through machine learning. Such learning may be performed, for example, in the electronic device 101 itself on which the artificial intelligence model is performed, or may be performed through a separate server (e.g., the server 108). The learning algorithm may include, for example, supervised learning, unsupervised learning, semi-supervised learning, or reinforcement learning, but it is not limited to the above examples. The artificial intelligence model may include a plurality of artificial neural network layers. The artificial neural network may include one or more of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network or a combination of two or more thereof, but it is not limited to the above example. The artificial intelligence model may include a software structure, either in addition to the hardware structure or alternatively.

The memory 130 may store various data used by at least one component of the electronic device 101 (e.g., the processor 120 or the sensor module 176). The data may include, for example, software (e.g., the program 140) and input/output data for instructions related thereto. The memory 130 may include the volatile memory 132 or the non-volatile memory 134.

The program 140 may be stored as a software in the memory 130, and may include, for example, an operating system 142, a middleware 144, or at least one application 146.

The input module 150 may receive instructions or data to be used in a component (e.g., the processor 120) of the electronic device 101 from the outside (e.g., from a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for a general purpose such as playback or recording of multimedia. The receiver may be used to receive incoming calls. According to one embodiment, the receiver may be implemented separately from or as a part of the speaker.

The display module 160 may provide visual information to the outside of the electronic device 101 (e.g., a user). The display module 160 may include, for example, a display, a hologram apparatus or a projector, and a control circuit to control that device. According to one embodiment, the display module 160 may include a touch sensor configured to sense a touch, or a pressure sensor configured to measure intensity of a force generated by the touch.

The audio module 170 may convert a sound into an electric signal or, conversely, an electric signal into a sound. According to one embodiment, the audio module 170 may obtain a sound through the input module 150, or output a sound through the sound output module 155 or an external electronic device (e.g., the electronic device 101, a speaker or a headphone) connected directly or wirelessly with the electronic device 101.

The sensor module 176 may detect an operating state (such as e.g., power or temperature) of the electronic device 101, or an external environmental state (e.g., a user state), and generate an electrical signal or data value corresponding to the sensed state. According to one embodiment, the sensor module 176 may include, for example, a gesture sensor, a gyro sensor, a barometric pressure sensor, a magnetic sensor, an acceleration sensor, a grip sensor, a proximity sensor, a color sensor, an IR (infrared) sensor, a biometric sensor, a temperature sensor, a humidity sensor, or a luminance sensor.

The interface 177 may support one or more designated protocols that can be used for the electronic device 101 to directly or wirelessly connect with an external electronic device (e.g., the electronic device 102). According to one embodiment, the interface 177 may include, for example, a high definition multimedia interface (HDMI), a universal serial bus (USB) interface, an SD card interface, or an audio interface.

The connecting terminal 178 may include a connector through which the electronic device 101 can be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electrical signal into either a mechanical stimulus (such as e.g., vibration or movement) or an electrical stimulus, which the user can perceive through tactile or kinesthetic sense. According to one embodiment, the haptic module 179 may include, for example, a motor, a piezoelectric element, or an electrical stimulation device.

The camera module 180 may capture still images and moving images. According to one embodiment, the camera module 180 may include one or more lenses, image sensors, image signal processors, or flashes.

The power management module 188 may be adapted to manage power supplied to the electronic device 101. According to one embodiment, the power management module 188 may be implemented as, for example, at least a part of a power management integrated circuit (PMIC).

The battery 189 may supply electrical power to at least one component of the electronic device 101. According to one embodiment, the battery 189 may include, for example, a non-rechargeable primary cell, a rechargeable secondary cell, or a fuel cell.

The communication module 190 may support to establish a direct (e.g., wired) communication channel or a wireless communication channel between the electronic device 101 and an external electronic device (e.g., the electronic device 102, the electronic device 104, or the server 108), and perform communications through the established communication channel. The communication module 190 may include one or more communication processors that can operate independently of the processor 120 (e.g., an application processor) and support direct (e.g., wired) communications or wireless communications. According to one embodiment, the communication module 190 may include a wireless communication module 192 (such as e.g., a cellular communication module, a short-range wireless communication module, or a global navigation satellite system (GNSS) communication module) or a wired communication module 194 (such as e.g., a local area network (LAN) communication module, or a power line communication module). A corresponding communication module of these communication modules may communicate with the external electronic device 104 via a first network 198 (e.g., a local area communication network such as e.g., Bluetooth, wireless fidelity (WiFi) direct, or infrared data association (IrDA)) or a second network 199 (e.g., a wide area communication network such as legacy cellular network, 5G network, next-generation communication network, Internet, or a computer network (e.g., LAN or WAN)). These various types of communication modules may be integrated into one component (e.g., a single chip) or may be implemented as a multiplicity of components (e.g., multiple chips) separate from each other. The wireless communication module 192 may use subscriber information (such as e.g., international mobile subscriber identifier (IMSI)) stored in the subscriber identification module 196 to identify or authenticate electronic device 101 within a communication network such as the first network 198 or the second network 199.

The wireless communication module 192 may support a 5G network after 4G network and a next-generation communication technology, for example, a new radio (NR) access technology. The NR access technology may support high-speed transmission of high-capacity data (i.e., eMBB enhanced mobile broadband), minimization of terminal power and connectivity of massive terminals (mMTC: massive machine-type communications), or ultra-reliable & low-latency communications (URLLC). The wireless communication module 192 may support, for example, a high-frequency band (e.g., mmWave band) to achieve a high data rate. The wireless communication module 192 may support various technologies for securing better performance in the high-frequency band, such as for example, beamforming, massive multiple-input and multiple-output (massive MIMO), full-dimensional MIMO (FD-MIMO), array antenna, analog beam-forming, or large-scale antenna. The wireless communication module 192 may support various technical requirements prescribed by the electronic device 101, an external electronic device (e.g., the electronic device 104, or a network system (e.g., the second network 199). According to one embodiment, the wireless communication module 192 may support peak data rate (e.g., 20 Gbps or more) for realizing eMBB, loss coverage (e.g., 164 dB or less) for realizing mMTC, or U-plane latency for realizing URLLC (e.g., for each of downlink (DL) and uplink (UL), 0.5 ms or less, or round trip 1 ms or less) can be supported.

The antenna module 197 may transmit or receive a signal or power to/from the outside (e.g., an external electronic device). According to one embodiment, the antenna module 197 may include at least one antenna having a radiator a conductor or a conductive pattern formed on a substrate (e.g., a PCB). According to one embodiment, the antenna module 197 may include a plurality of antennas (e.g., an array antenna). In that case, at least one antenna suitable for a communication system used in a communication network such as e.g., the first network 198 or the second network 199 may be selected from the plurality of antennas by the communication module 190, for example. A signal or power may be transmitted or received between the communication module 190 and an external electronic device, via the at least one antenna selected. According to some embodiments, other devices or components, such as e.g., a radio frequency integrated circuit (RFIC), other than the radiator may be additionally formed as a part of the antenna module 197.

According to various embodiments, the antenna module 197 may form an mmWave antenna module. According to one embodiment, the mmWave antenna module may include a printed circuit board, an RFIC disposed on or adjacent to a first surface (e.g., bottom surface) of the printed circuit board and capable of supporting a designated high-frequency band (e.g., mmWave band), and a plurality of antennas (e.g., an array antenna) disposed on or adjacent to a second surface (e.g., top or side surface) of the printed circuit board and capable of transmitting or receiving signals in the designated high-frequency band.

At least some of the above components may be connected to each other through a certain communication scheme between peripheral devices (e.g., bus, general purpose input and output (GPIO), serial peripheral interface (SPI), mobile industry processor interface (MIPI), or the like) and may exchange signals (e.g., instructions or data) with each other.

According to one embodiment, instructions or data may be transmitted or received between the electronic device 101 and the external electronic device 104 via the server 108 connected to the second network 199. Each of the external electronic devices 102 or 104 may be the same as or different from the electronic device 101. According to one embodiment, all or part of the operations executed in the electronic device 101 may be executed in at least one of the external electronic devices 102 and 104, or the server 108. For example, when the electronic device 101 has to perform a certain function or service automatically or in response to a request from a user or another device, the electronic device 101 may request one or more external electronic devices to perform at least part of the function or service, instead of executing the function or service itself or in addition thereto. The one or more external electronic devices that have received the request may execute at least part of the requested function or service, or an additional function or service related to the request, and then transmit a result of the execution to the electronic device 101. The electronic device 101 may provide the result as it is or further process, so as to provide the same as at least part of a response to the request. For this purpose, it may be utilized, for example, cloud computing, distributed computing, mobile edge computing (MEC), or client-server computing technology. The electronic device 101 may provide an ultra-low latency service using, for example, distributed computing or mobile edge computing. In another embodiment, the external electronic device 104 may include an Internet of Things (IoT) device. The server 108 may be of an intelligent server using machine learning and/or neural networks. According to one embodiment, the external electronic device 104 or the server 108 may be incorporated into the second network 199. The electronic device 101 may be applied to an intelligent service (e.g., smart-home, smart-city, smart-car, or healthcare) based on 5G communication technology and IoT-related technology.

According to an embodiment, the processor (e.g., processor 120 of FIG. 1) of the electronic device (e.g., electronic device 101 of FIG. 1) may use a VPN when the electronic device communicates with a public AP in a place where there is a possible hacking threat. For example, the processor may identify an AP to which the electronic device is connected as a public AP based on location information (e.g., POI (point of interest)) of the electronic device, and use the VPN for communication through the AP based on the identification.

The processor according to an embodiment may identify that the connected AP is a public AP based at least in part on location information of the electronic device and identification information of the connected AP. Hereinafter, specific operations of the electronic device and the server for the above-described embodiments will be described. The electronic device described below may correspond to the electronic device 101 of FIG. 1. The server described below may correspond to the server 104 of FIG. 1.

Figure 2:
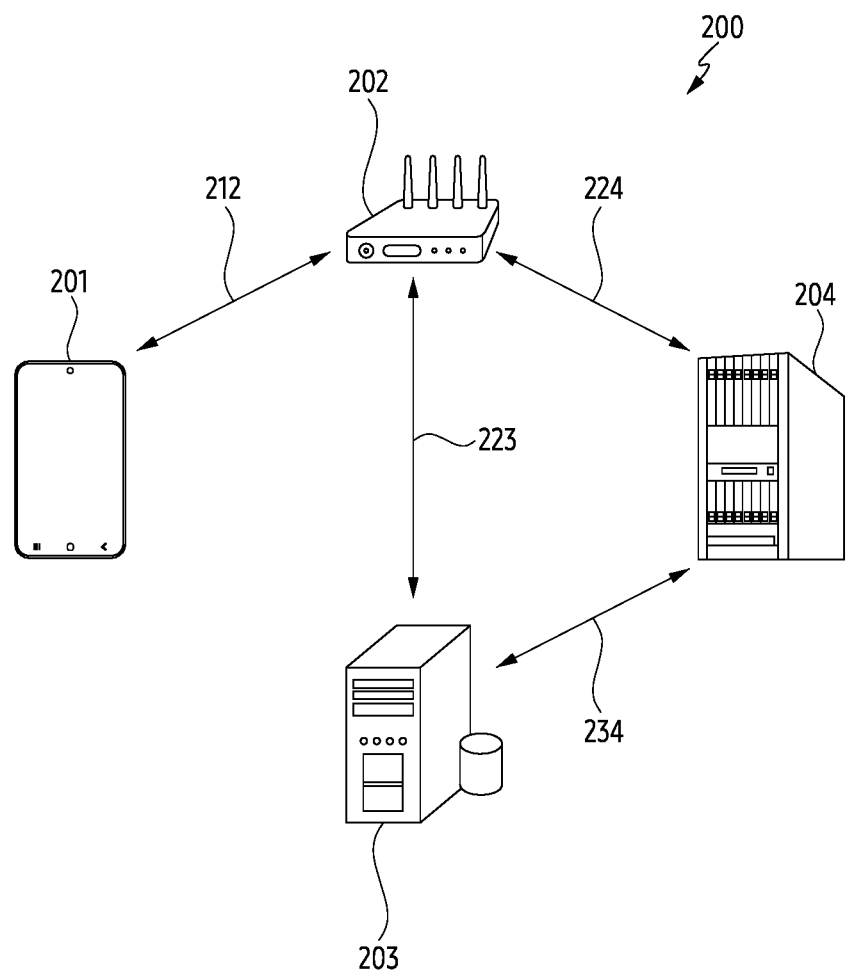
FIG. 2 illustrates an environment in which an electronic device communicates with an external electronic device according to various embodiments.

FIG. 2 illustrates an environment for an electronic device according to various embodiments to communicate with an external electronic device.

Referring to FIG. 2, the environment 200 may include an electronic device 201, an AP 202, a server 203, and an external electronic device 204.

The electronic device 201 may be located within a coverage of the AP 202. The electronic device 201 may identify the AP 202 based on at least one operation for network identification. The electronic device 201 may identify the AP 202 based on either active scanning and/or passive scanning.

For example, the electronic device 201 may transmit a probe request frame based on the active scanning. The electronic device 201 may identify the AP 202 based on receiving a probe response frame for the probe request frame.

As another example, the electronic device 201 may receive a beacon frame transmitted from the AP 202 based on the passive scanning. The electronic device 201 may identify the AP 202 based on the beacon frame.

Meanwhile, the electronic device 201 may establish a connection with the AP 202 after identifying the AP 202.

According to various embodiments, the AP 202 may be used for each of a plurality of electronic devices to communicate with the external electronic device 204. For example, the AP 202 may be used jointly by a plurality of electronic devices of a number of unspecified users. For example, the AP 202 may be used to provide a wireless LAN connection to a plurality of electronic devices used by a number of unspecified users.

The AP 202 may be variously referred to. For example, the AP 202 may be referred to as a public AP distinct from a private AP used by a particular individual or group. For example, the AP 202 may be referred to as a first type of AP commonly used by a plurality of electronic devices of a number of unspecified users, which is distinguished from a second type of AP used by an individual or a certain group.

According to an embodiment, a security procedure for establishing a connection with the AP 202 may not be required. For example, the electronic device 201 may establish a connection with the AP 202 without performing any security procedure. The security procedure may include a first procedure for obtaining a user identifier (ID) and a password for accessing the AP 202 from a user of the electronic device 201. The security procedure may further include a second procedure of performing user authentication by transmitting the obtained user identifier and password to the AP 202 and receiving an authentication result from the AP 202.

The electronic device 201 may establish a connection 212 with the AP 202. The AP 202 may communicate with the external electronic device 204 through a connection 224. For example, the electronic device 201 may communicate with the external electronic device 204 through the AP 202. For example, the electronic device 201 may communicate with the external electronic device 204 through the connection 212 and the connection 224. For example, the electronic device 201 may transmit data to the AP 202 through the connection 212, and the AP 202 may transmit data received from the electronic device 201 to the external electronic device 204 through the connection 224.

For example, the connection 212 may be a connection between the electronic device 201 and the AP 202. As another example, the connection 223 may be a connection between the AP 202 and the server 203. As another example, the connection 224 may be a connection between the AP 202 and the external electronic device 204. As another example, the connection 234 may be a connection between the server 203 and the external electronic device 204.

According to an embodiment, the electronic device 201 may establish a connection with the server 203. For example, the electronic device 201 may establish a connection with the server 203 through the connected AP 202 using the first communication circuit.

The server 203 may identify (or determine) whether the AP 202 is a first type of AP. For example, the server 203 may identify whether the AP 202 is the first type of AP by identifying the number of electronic devices connected to the AP 202.

According to an embodiment, the server 203 may be used for VPN. The server 203 may create a private link in a public network based on a request from the electronic device 201. The server 203 may receive data from the electronic device 201 and transmit the data to a destination (e.g., the external electronic device 204) of the data based on a private link. For example, the electronic device 201 may communicate with the external electronic device 204 through the connection 212, the connection 223, and the connection 234

According to an embodiment, the server 203 may be physically or logically classified based on a function. In an embodiment, the server 203 may include a first server for identifying whether the AP 202 is a first type of AP, and a second server physically distinguished from the first server and for VPN. In an embodiment, the server 203 may include the first server for identifying whether the AP 202 is the first type of AP, and the second server for a VPN integrally configured with the first server but logically distinguished from the first server. However, it is not limited thereto.

According to an embodiment, the electronic device 201 may establish a connection with the AP 202 using at least one communication circuit. The electronic device 201 may transmit the first signal obtained based at least in part on the location information of the electronic device 201 and the identification information of the AP 202 to the server 203.

The server 203 may receive a plurality of signals including the first signal. The server 203 may receive a plurality of signals including the first signal within a predetermined time interval. The server 203 may transmit a second signal or a third signal to the electronic device 201 based on a plurality of signals. For example, a plurality of signals obtained based on at least part of location information of each of the plurality of electronic devices and identification information of the AP 202 may be received from each of the plurality of electronic devices within a predetermined time interval. For example, the second signal may be transmitted to set a plurality of electronic devices to communicate with an external electronic device through the AP 202 and the AP 202 of the server 203. As another example, the third signal may be transmitted to set a plurality of electronic devices to communicate with an external electronic device through both the AP 202 and the server 203.

The electronic device 201 may communicate with the external electronic device 204 through the AP 202 of the AP 202 and the server 203 based on receiving the second signal. In other words, the electronic device 201 may transmit data to the external electronic device 204 through the connection 212 and the connection 224. For example, the electronic device 201 may maintain a state of the VPN mode in an inactive state based on receiving the second signal. The electronic device may communicate with the external electronic device 204 through the AP 202 of the AP 202 and the server 203, while the state of the VPN mode is maintained in the inactive state.

The electronic device 201 may communicate with the external electronic device 204 via both the AP 202 and the server 203 based on receiving the third signal. In other words, the electronic device 201 may transmit data to the external electronic device 204 through the connection 212, the connection 223, and the connection 234. For example, the electronic device 201 may change the state of the mode for the VPN mode from the inactive state to the active state based on the receiving of the third signal.

Hereinafter, in the above-described environment 200, detailed configurations and operations of the electronic device 201 and the server 203 will be described in more detail.

Figure 3A:
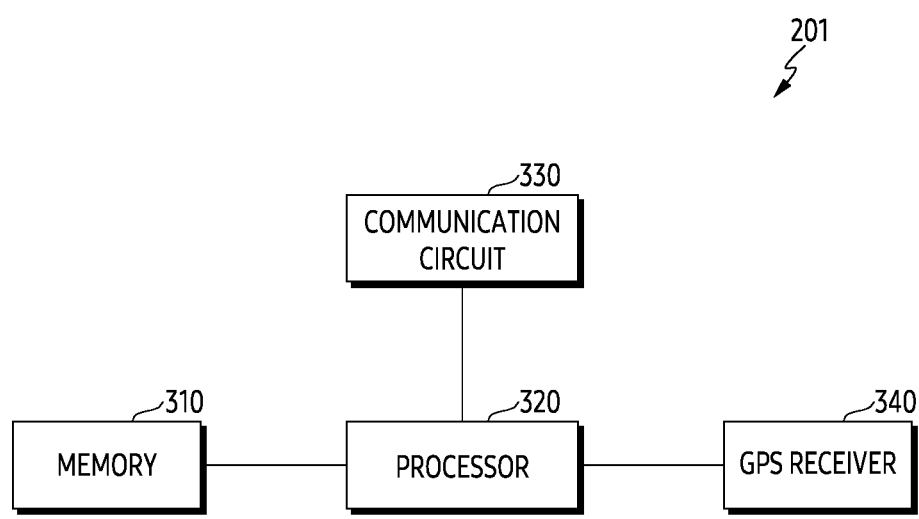
FIG. 3A is a simplified block diagram of an electronic device according to various embodiments.

FIG. 3A is a simplified block diagram of an electronic device according to various embodiments.

Referring to FIGS. 2 and 3A, the electronic device 201 may correspond to the electronic device 101 of FIG. 1. The electronic device 201 may include a memory 310, a processor 320, a communication circuit 330, and a GPS receiver 340.

The memory 310 may correspond to the memory 130 of FIG. 1.

The communication circuit 330 may correspond to the communication module 190 of FIG. 1. For example, the communication circuit 330 may include one or more communication circuits. For example, the electronic device 201 may include a first communication circuit and a second communication circuit. The first communication circuit may be used for wireless local area network (WLAN) communication. The second communication circuit may be used for cellular communication. For example, the electronic device 201 may establish a connection with the AP through the first communication circuit. For example, the electronic device 301 may establish a connection with an AP supporting a wireless LAN connection and communicate with an external electronic device.

The GPS receiver 340 may correspond to the GNSS communication module, which is an example of the wireless communication module 192 of FIG. 1. The GPS receiver 340 may be used to receive GPS signals. Such a GPS may include at least one of global navigation satellite system (GLONASS), Beidou navigation satellite system (Beidou), quasi-zenith satellite system (QZSS), Indian regional satellite system (IRNSS) or Galileo (the European global satellite-based navigation system), depending on the area of use or the bandwidth. The electronic device 201 may obtain location information of the electronic device 201 using the GPS receiver 340.

The processor 320 may be operatively connected to the memory 310, the communication circuit 330, and the GPS receiver 340. A detailed configuration (or module) included in the processor 320 will be described with reference to FIG. 3B.

Figure 3B:
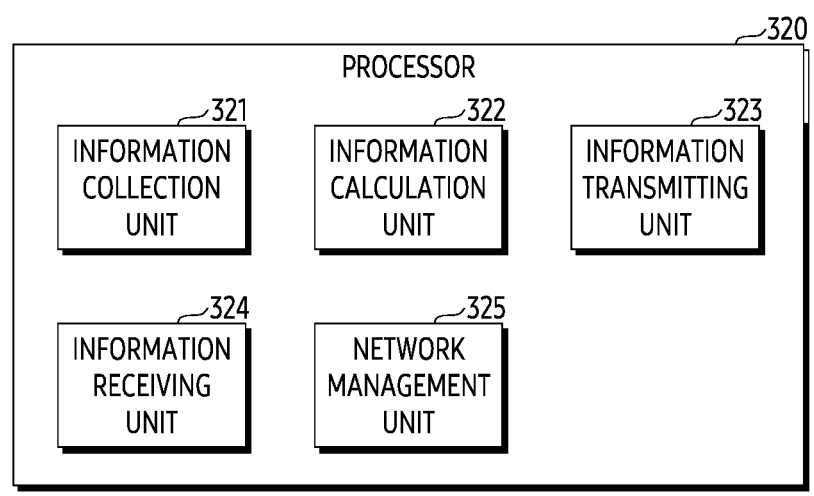
FIG. 3B is a simplified block diagram of a processor included in an electronic device according to various embodiments.

FIG. 3B is a simplified block diagram of a processor included in an electronic device according to various embodiments.

Referring to FIGS. 2, 3A and 3B, the processor 320 may correspond to the processor 320 of FIG. 3A. The processor 320 may include an information collection unit 321, an information calculation unit 322, an information transmitting unit 323, an information receiving unit 324, and a network management unit 325. The information collection unit 321, the information calculation unit 322, the information transmitting unit 323, the information receiving unit 324, and the network management unit 325 may be either functionally divided or logically divided within the processor 320 of the electronic device 201. In other words, the processor 320 of the electronic device 201 may be connected to various modules (or circuits) of the electronic device 201 to perform operations performed by the information collection unit 321, the information calculation unit 322, the information transmitting unit 323, the information receiving unit 324, and the network management unit 325. Although not illustrated in FIG. 3B, according to an embodiment, instructions corresponding to the information collection unit 321, the information calculation unit 322, the information transmitting unit 323, the information receiving unit 324, and the network management unit 325 may be stored in the memory 310.

In response to the electronic device 201 establishing a connection with the AP 202 using at least one communication circuit, the information collection unit 321 may obtain data related to the location of the electronic device 201 using the GPS receiver 340. For example, the information collection unit 321 may obtain data on a latitude value of the electronic device 201 and data on a longitude value.

The information collection unit 321 may obtain identification information on the AP 202 to which the electronic device 201 is connected. For example, the information collection unit 321 may obtain a service set identifier (SSID) and/or a basic service set identifier (BSID) of the AP 202.

The information collection unit 321 may transmit the obtained data on the location of the electronic device 201 and the identification information on the AP 202 to the information calculation unit 322.

The information calculation unit 322 may receive data on the location of the electronic device 201 and/or the identification information on the AP 202 obtained from the information collection unit 321.

The information calculation unit 322 may obtain the location information of the electronic device 201 by changing data on the location of the electronic device 201 based on reference information obtained from the server 203. For example, the reference information may be stored in the memory 310 of the electronic device 201. The information calculation unit 322 may obtain the location information of the electronic device based on the reference information stored in the memory 310.

For example, the information calculation unit 322 may obtain information on the latitude of the electronic device 201 included in the location information of the electronic device 201 by changing the data on the latitude value of the electronic device 201 based on the reference information obtained from the server 203. Further, the information calculator 322 may obtain the information on the longitude of the electronic device 201 included in the location information of the electronic device 201 by changing the data on the longitude value of the electronic device 201 based on the reference information.

For example, the information calculation unit 322 may obtain the latitude information by truncation of a specific number of decimal places or more from a latitude value indicated through data on the latitude value of the electronic device 201 based on the reference information. Further, the information calculation unit 322 may obtain the longitude information by truncation of a specific number of decimal places or more from a longitude value indicated through data on the longitude value of the electronic device 201. As an example, the information calculation unit 322 may obtain a latitude value of the electronic device 201 as 37.56522217837964. The information calculation unit 322 may obtain a longitude value of the electronic device 201 as 126.98374031723614. The information calculation unit 322 may obtain information on latitude and longitude of the electronic device 201 by truncation of the fourth decimal place or less from each of the latitude and longitude values.

For example, the information calculator 322 may obtain information on the latitude of the electronic device 201 as 37.565 and obtain information on the longitude of the electronic device 201 as 126.983. The electronic device 201 may have tolerance within about 100 m by using the latitude value and the longitude value up to three decimal places. Thus, the electronic device 201 may obtain the same location information for the electronic devices located within a radius of about 100 m (or an area of 100 m×100 m).

According to an embodiment, the reference information for use in changing the data on the latitude value and the data on the longitude value may be variously changed. For example, the reference information may be stored in the memory 310 and then retrieved as required. For example, the electronic device 201 may obtain the reference information from the server 203. The electronic device 201 may obtain changed reference information from the server 203 based on the environment in which the electronic device 201 is located. The electronic device 201 may obtain the reference information changed based on the number of neighboring APs that may be accessed in the vicinity of the electronic device 201. For example, the electronic device 201 may change the reference information based on the purpose of the service performed by the electronic device 201. As another example, the electronic device 201 may receive the changed reference information from the server 203 based on the purpose of the service performed by the electronic device 201. For another example, the electronic device 201 may receive the changed reference information from the server 203 based on the density of neighboring APs (e.g., AP 202) located in a certain area.

The information calculation unit 322 may obtain a first signal based at least in part on location information of the electronic device 201 and the identification information of the AP 202. For example, the information calculation unit 322 may generate the first signal through the location information of the electronic device 201 and the identification information of the AP 202. For example, the information calculation unit 322 may obtain the first signal by hashing at least part of the location information of the electronic device 201 and the identification information of the AP 202.

For example, the information calculation unit 322 may obtain hashing information (or digest) by hashing information on the latitude of the electronic device 201, information on the longitude of the electronic device 201, SSID of the AP 202, and BSSID of the AP 202. As an example, the information calculation unit 322 may obtain an input value for a hash function (e.g., SHA-256) by sequentially listing the information on the latitude of the electronic device 201, the information on the longitude of the electronic device 201, the SSID of the AP 202, and the BSSID of the AP 202. The information calculator 322 may obtain the hashing information by obtaining a resultant value for the hash function based on an input value for the hash function. The obtained hashing information may be included in the first signal. For example, the hashing information may be obtained with Equation 1.

Digest=*H*(partial latitude|partial longitude|SSID|BSSID)      [Equation 1]

Referring to the Equation 1, 'Digest' is the hashing information; 'H( )' is the Hash function; 'Partial latitude' is information on the latitude; 'Partial longitude' is information on the longitude; 'SSID' is the SSID of the AP 202; and 'BSSID' is the BSSID of the AP 202.

The information transmitting unit 323 and the information receiving unit 324 may transmit and receive signals through the communication circuit 330 of the electronic device 201, respectively. For example, the information transmitting unit 323 may transmit the first signal obtained through the information calculator 322 to the server 203. For example, the information receiving unit 324 may receive the second signal and/or the third signal from the server 203

For example, the information transmitting unit 323 and the information receiving unit 324 may control the communication circuit 330 of the electronic device 201. The information transmitting unit 323 and the information receiving unit 324 may receive or transmit at least one signal (e.g., a first signal, a second signal, or a third signal) by controlling the communication circuit 330. For example, the information receiving unit 324 may receive at least one signal by controlling the communication circuit 330. As another example, the information transmitting unit 323 may transmit at least one signal by controlling the communication circuit 330.

For example, the information receiving unit 324 may receive reference information for obtaining location information of the electronic device 201 from the server 203 through the communication circuit 330. The information receiving unit 324 may transmit the received reference information to the memory 310. The received reference information may be stored in the memory 310.

The network management unit 325 may change a state of the mode for the VPN. For example, the state of the mode for the VPN may include an active state and an inactive state. In the active state, the electronic device 201 may communicate with the external electronic device 204 through both the AP 202 and the server 203. In the inactive state, the electronic device 201 may communicate with the external electronic device 204 through the AP 202 of the AP 202 or the server 203. In other words, the electronic device 201 may communicate with the external electronic device 204 without going through the server 203. In other words, after receiving the second signal, the electronic device 201 may perform communication with the external electronic device 204 via the AP 202, without using the server 203.

According to an embodiment, the information receiving unit 324 may receive the second signal from the server 203 while the mode for VPN is operating in the inactive state. The network management unit 325 may maintain the state of the mode for the VPN as the inactive state based on receiving the second signal. The information receiving unit 324 may receive a third signal from the server 203 while the mode for VPN is operating in the inactive state. The network management unit 325 may change the state of the mode for the VPN to the active state based on receiving the third signal.

According to an embodiment, the information receiving unit 324 may receive the second signal from the server 203 while the mode for VPN is operating in the active state. The network management unit 325 may change the state of the mode for the VPN from the active state to the inactive state based on receiving the second signal. The information receiving unit 324 may receive the third signal from the server 203 while the VPN mode is operating in the active state. The network management unit 325 may maintain the state of the mode for the VPN in the active state based on receiving the third signal.

Figure 4A:
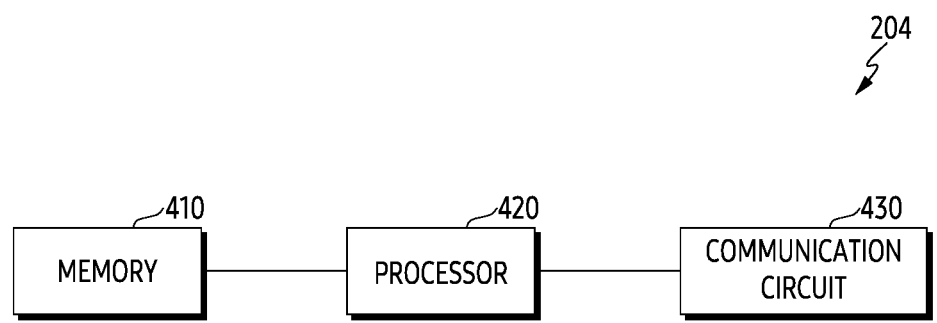
FIG. 4A is a simplified block diagram of a server according to various embodiments.

FIG. 4A is a simplified block diagram of a server according to various embodiments.

Referring to FIGS. 2 and 4A, the server 203 may include a memory 410, a processor 420, and a communication circuit 430.

The memory 410 may correspond to the memory 130 of FIG. 1. The memory 410 may store various information for communicating with the electronic device 201. For example, the memory 410 may store information required to access the server 203. As an example, the memory 410 may include configuration information for accessing the server 203.

The communication circuit 430 may correspond to the communication module 190 of FIG. 1. For example, the communication circuit 430 may include one or more communication circuits.

The processor 420 may be operatively connected to the memory 410 and the communication circuit 430. A detailed configuration (or module) included in the processor 420 will be described with reference to FIG. 4B.

Figure 4B:
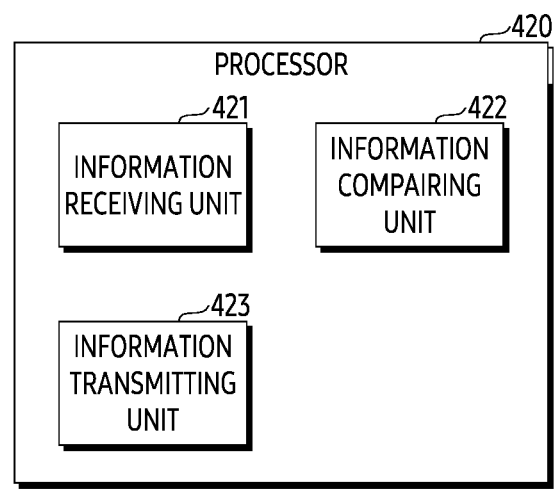
FIG. 4B is a simplified block diagram of a processor included in a server according to various embodiments

FIG. 4B is a simplified block diagram of a processor included in a server according to various embodiments.

Referring to FIGS. 2, 4A, and 4B, the processor 420 may correspond to the processor 420 of FIG. 4A.

The processor 420 may include an information receiving unit 421, an information comparison unit 422, and an information transmitting unit 423.

Using the communication circuit 430, the information receiving unit 421 may receive, from each of the plurality of electronic devices, a plurality of signals respectively obtained based at least in part on the location information of each of the plurality of electronic devices and the identification information of the AP 202. For example, the information receiving unit 421 may control the communication circuit 430 of the server 204. The information receiving unit 324 may receive at least one signal by controlling the communication circuit 430.

For example, the plurality of electronic devices may include the electronic device 201. The information receiving unit 421 may receive a first signal among a plurality of signals from the electronic device 201. The first signal may include hashing information.

The information comparison unit 422 may identify the number of a plurality of signals received within a predetermined time interval. For example, the predetermined time interval may be composed of a plurality of slot sections (or time sliding windows). The information comparison unit 422 may obtain the first signal received from the electronic device 201 without receiving any signal. The information comparison unit 422 may identify a start timing of the predetermined time interval based on obtaining the first signal. The information comparison unit 422 may identify whether a plurality of signals each including hashing information equal to the hashing information included in the first signal are received during the predetermined time interval from the start timing. The information comparison unit 422 may identify the number of the plurality of signals received during the predetermined time interval.

According to an embodiment, the information comparison unit 422 may identify the number of signals obtained in each of the plurality of slot sections among the plurality of signals, during the plurality of slot sections from the start timing. A detailed operation of identifying the number of signals obtained by the information comparison unit 422 within the plurality of slot sections will be described later with reference to FIG. 10.

The information comparison unit 422 may store the number of signals obtained within the plurality of slot sections using the memory 410.

The information transmitting unit 423 may transmit a second signal or a third signal to a plurality of electronic devices through the communication circuit 430. For example, the information transmitting unit 423 may control the communication circuit 430 of the server 204. The information transmitting unit 423 may transmit at least one signal by controlling the communication circuit 430

For example, the information transmitting unit 423 may transmit the second signal to a plurality of electronic devices based on identifying that the number of the plurality of signals received within the predetermined time interval is less than a predetermined number. The second signal may be transmitted to set a plurality of electronic devices to communicate with an external electronic device through the AP 202 of the AP 202 or the server 203.

The information transmitting unit 423 may transmit the third signal to the plurality of electronic devices based on identifying that the number of the plurality of signals received within the predetermined time interval is greater than or equal to the predetermined number. The third signal may be transmitted to set the plurality of electronic devices to communicate with the external electronic device through both the AP 202 and the server 203.

Figure 5:
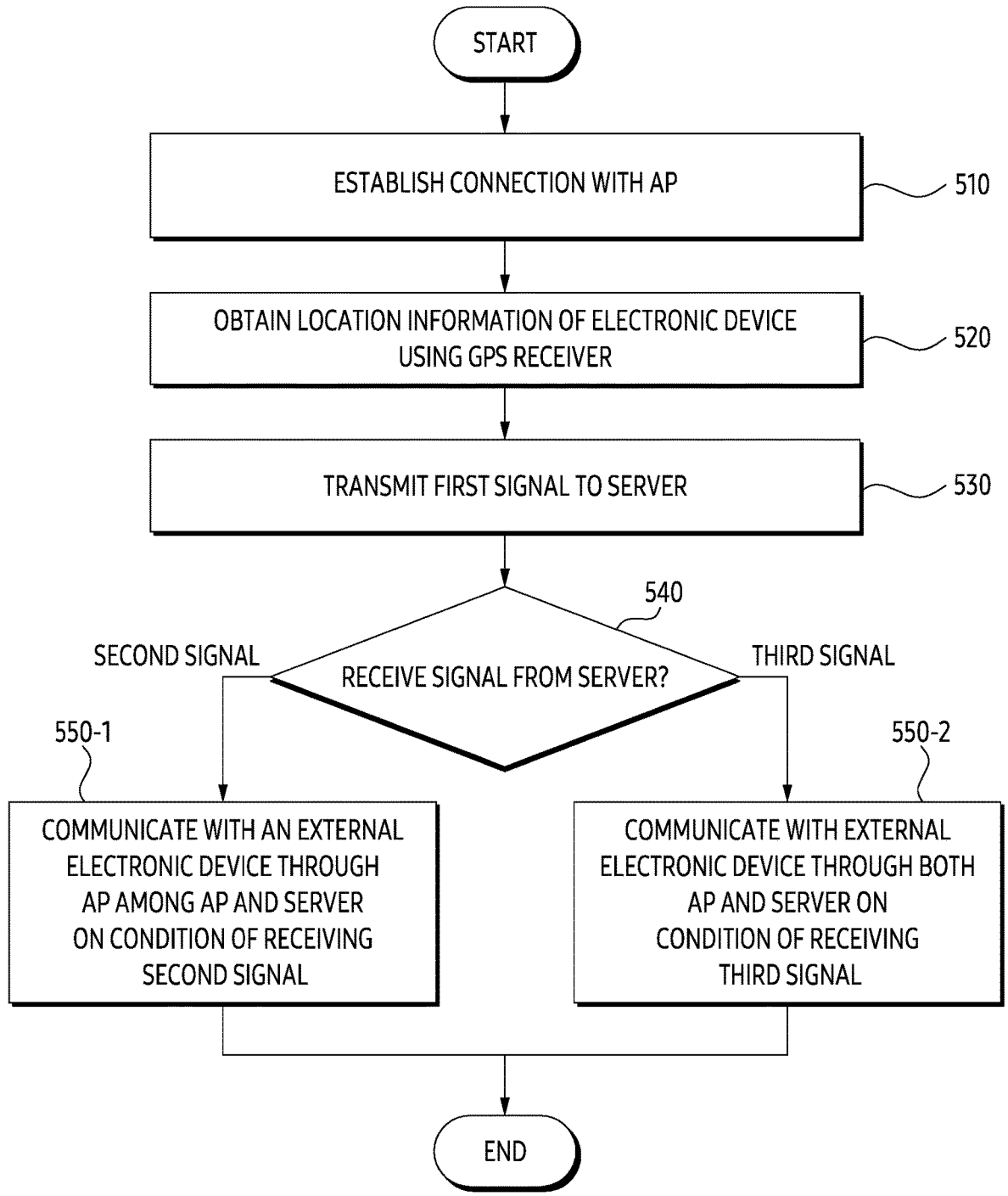
FIG. 5 is a flowchart illustrating an operation of an electronic device according to various embodiments.

FIG. 5 is a flowchart illustrating an operation of an electronic device according to various embodiments.

This method may be executed by the electronic device 201 and the processor 320 of the electronic device 201 shown in FIGS. 3A and 3B.

Referring to FIG. 5, in operation 510, the processor 320 may establish a connection with an AP (e.g., AP 202). The processor 320 may establish the connection with the AP using the communication circuit 330. For example, the processor 320 may establish the connection with the AP based on being located within a coverage range of the AP. The processor 320 may identify the AP by performing passive scanning or active scanning. The processor 320 may establish the connection with the AP through an association process with the AP. For example, the AP may be a first type of AP used in common by a plurality of electronic devices of a number of unspecified users.

In operation 520, the processor 320 may obtain the location information of the electronic device 201 using the GPS receiver 340. The processor 320 may obtain location information of the electronic device 201 using the GPS receiver 340, in response to establishing the connection with the AP.

The location information of the electronic device 201 may include information on the latitude of the electronic device 201 and information on the longitude of the electronic device 201. The processor 320 may obtain data on the location of the electronic device 201. The processor 320 may obtain the location information of the electronic device 201 by changing data on the location of the electronic device 201 based on the reference information. For example, the reference information may be received from a server (e.g., the server 203) to obtain the location information of the electronic device 201. As another example, the reference information may be stored in the memory 310 of the electronic device 201.

For example, the processor 320 may obtain information on the latitude of the electronic device 201, by changing the data on the latitude value among the data on the location of the electronic device 201. The processor 320 may obtain information on the longitude of the electronic device 201, by changing the data on the longitude value among the data on the location of the electronic device 201.

According to an embodiment, the reference information may be used to truncate a specific number of decimal places or more from data on the location. The reference information may include information on the number of decimal places to be truncated. Based on the reference information, the processor 320 may obtain the information on the latitude by truncating the specific number of decimal places or more from a latitude value indicated by the data on the latitude value of the electronic device 201. Based on the reference information, the processor 320 may obtain information on the longitude by truncating the specific number of decimal places or more from a longitude value indicated by data on the longitude value of the electronic device 201.

In operation 530, the processor 320 may transmit the first signal to the server. The processor 320 may transmit the first signal obtained based at least in part on the location information of the electronic device 201 and the identification information of the AP to the server for the VPN using the communication circuit 330.

For example, the processor 320 may obtain the first signal including the hashing information obtained by hashing at least some of the location information of the electronic device 201 and the identification information of the AP. The identification information of the AP may include a unique ID assigned to the AP for distinguishing from another AP distinguished from the AP. The unique ID may include SSID of the AP and BSSID of the AP. For example, the electronic device 201 may hash information on the latitude of the electronic device 201, information on the longitude of the electronic device 201, SSID of the AP, and the BSSID of the AP to obtain the first signal including the hashing information.

In operation 540, the processor 320 may receive a signal from the server. The processor 320 may receive a second signal or a third signal from the server. The processor 320 may receive the first signal or the third signal from the server that received a plurality of signals within a predetermined time interval, the plurality of signals, including the first signal, respectively obtained based at least in part on the location information of each of a plurality of electronic devices and the identification information of the AP from the plurality of electronic devices including the electronic device 201.

For example, the server may receive, within a predetermined time interval, a plurality of signals each obtained based at least in part on the location information of each of the plurality of electronic devices and the identification information of the AP, from each of the plurality of electronic devices including electronic device 201. The server may receive a plurality of signals including the first signal within a predetermined time interval. The plurality of signals may be respectively obtained from each of the plurality of electronic devices based at least in part on the location information of each of the plurality of electronic devices and the identification information of the AP. In other words, each of a plurality of electronic devices may obtain the plurality of signals based at least in part on the location information of each of the plurality of electronic devices and the identification information of the AP. The plurality of electronic devices may transmit each of the plurality of signals to the server.

According to an embodiment, at least some information included in the plurality of signals may respectively correspond to at least some information included in the first signal. For example, the location information of each of the plurality of electronic devices may be obtained from the plurality of electronic devices so as to correspond to each other based on the reference information. Accordingly, the hashing information included in the plurality of signals may correspond to the hashing information included in the first signal.

Meanwhile, the second signal may be transmitted from the server to the electronic device 201 on a condition that the number of the plurality of signals received from the server within the predetermined time interval is less than a predetermined number. In other words, the processor 320 may receive the second signal from the server based on that the number of the plurality of signals received from the server within the predetermined time interval is less than the predetermined number.

The third signal may be transmitted from the server to the electronic device on a condition that the number of the plurality of signals received from the server within the predetermined time interval is equal to or greater than a predetermined number. In other words, the processor 320 may receive the third signal from the server based on that the number of the plurality of signals received from the server within the predetermined time interval is equal to or greater than the predetermined number.

In operation 550-1, the processor 320 may communicate with an external electronic device through the AP among the AP and the server, on a condition of receiving the second signal. For example, the processor 320 may communicate with the external electronic device through the AP or the server based on receiving the second signal. The processor 320 may set (or maintain) a state of the mode for the VPN to be the inactive state based on receiving the second signal. The processor 320 may communicate with the external electronic device through the AP or the server based on setting (or maintaining) the state of the mode for the VPN to an inactive state.

In operation 550-2, the processor 320 may communicate with the external electronic device through both the AP and the server on a condition of receiving the third signal. For example, the processor 320 may communicate with the external electronic device through both the AP and the server based on receiving the third signal. Based on receiving the third signal, the processor 320 may set (or change) the state of the mode for the VPN from the inactive state to the active state. The processor 320 may communicate with the external electronic device through both the AP and the server based on setting (or changing) the state of the mode for the VPN to the active state.

According to an embodiment, the processor 320 may obtain information on the type of the AP based on receiving the third signal. The processor 320 may store the information on the type of the AP using the memory 310. For example, the processor 320 may store the information that the type of the AP is a first type using the memory 310.

The processor 320 may change the state of the mode for the VPN from the active state to the inactive state in response to part of information with the AP. After disconnecting the connection of the AP, the processor 320 may re-establish a connection with the AP. The processor 320 may obtain the information on the type of the AP from the memory 310, in response to the connection (or re-connection) with the AP. The processor 320 may identify that the AP type is the first type based on the information on the AP type obtained from the memory 310. The processor 320 may bypass transmitting the first signal in response to obtaining the information on the type of AP. In other words, the processor 320 may omit transmitting the first signal in response to obtaining the information on the type of the AP. The processor 320 may bypass transmitting the first signal and change the state of the mode for the VPN from the inactive state to the active state.

For example, based on the user of the electronic device 201 visiting a first location where an AP is located, the processor 320 may establish a connection with the AP. The processor 320 may change a state of the mode for the VPN from an inactive state to an active state based on that the type of the AP is the first type. The processor 320 may store information that the type of the AP is the first type using the memory 310. After connection with the AP is established, the user of the electronic device 201 may move away from the first location. The processor 320 may disconnect the connection with the AP based on the user of the electronic device 201 leaving the first location. Based on the user of the electronic device 201 visiting again the first location where the AP is located, the processor 320 may obtain information on the type of the AP from the memory 310. The processor 320 may bypass transmitting the first signal based on acquiring the information on the type of the AP, and change the state of the mode for the VPN from the inactive state to the activated state.

Figure 6:
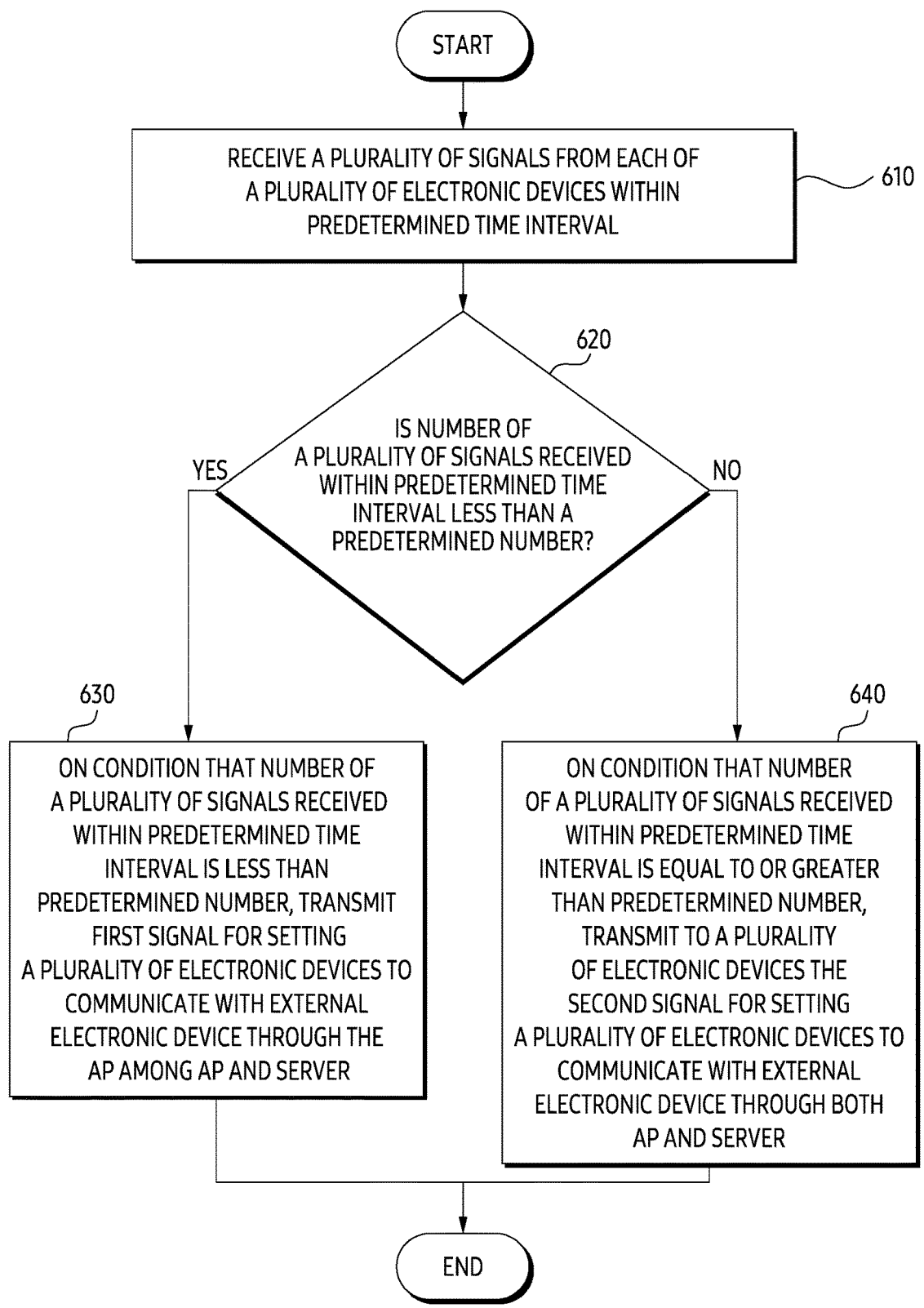
FIG. 6 is a flowchart illustrating an operation of a server according to various embodiment.

FIG. 6 is a flowchart illustrating an operation of a server according to various embodiments.

This method may be executed by the server 204 illustrated in FIGS. 4A and 4B and the processor 420 of the server 204.

Referring to FIG. 6, in operation 610, the processor 420 may receive a plurality of signals from each of a plurality of electronic devices (e.g., the electronic device 202) within a predetermined time interval. Within the predetermined time interval, the processor 420 may receive the plurality of signals, each obtained based at least in part on the location information of each of the plurality of electronic devices and the identification information of the AP (e.g., AP 202), from each of the plurality of electronic devices.

The processor 420 may receive the plurality of signals within the predetermined time interval. The plurality of signals may be respectively obtained from each of the plurality of electronic devices based at least in part on the location information of each of the plurality of electronic devices and the identification information of the AP. In other words, each of the plurality of electronic devices may acquire the plurality of signals based at least in part on the location information of each of the plurality of electronic devices and the identification information of the AP. The processor 420 may receive the plurality of signals obtained from the plurality of electronic devices, respectively.

The plurality of electronic devices may be connected to the same AP. At least some information included in the plurality of signals each obtained from the plurality of electronic devices may correspond to each other. For example, the location information of each of the plurality of electronic devices may be obtained based on reference information. The location information of each of the plurality of electronic devices may be configured to correspond to each other on the basis of a predetermined distance. For example, the location information of each of the plurality of electronic devices may be configured to be identical to each other on the basis of the predetermined distance. As the plurality of signals are obtained based on the location information and the identification information of the AP, corresponding to each other, at least some information included in the plurality of signals may correspond to each other.

In operation 620, the processor 420 may identify whether the number of a plurality of signals received within the predetermined time interval is less than a predetermined number. The processor 420 may identify the number of the plurality of signals received within the predetermined time interval.

According to an embodiment, the processor 420 may identify whether at least some of information included in the plurality of signals each obtained based at least in part on the location information of each of the plurality of electronic devices and the identification information of the AP within the predetermined time interval corresponds to each other.

The processor 420 may identify the number of the plurality of signals received within the predetermined time interval based on that at least some of the information included in the plurality of signals corresponds to each other.

For example, the processor 420 may identify whether first hashing information included in a signal received from a first electronic device of the plurality of signals and second hashing information included in a signal received from a second electronic device of the plurality of signals correspond to each other. The first hashing information may be obtained based at least in part on the location information of the first electronic device and the identification information of the AP. The second hashing information may be obtained based at least in part on the location information of the second electronic device and the identification information of the AP.

For example, the location information of the first electronic device and the location information of the second electronic device may be obtained based on the same reference information. The location information of the first electronic device and the location information of the second electronic device may be set to be the same location information within a predetermined area based on the reference information. Accordingly, the first hashing information obtained based at least in part on the identification information of the first electronic device and the AP and the second hashing information obtained based at least in part on the identification information of the second electronic device and the AP may be identically set. The processor 320 may identify whether the first hashing information and the second hashing information are the same as each other. Based on identifying whether the first hashing information and the second hashing information are the same, the processor 320 may identify that the first electronic device and the second electronic device are located within the predetermined area based on the reference information and are connected to the same AP.

In operation 630, when the number of the plurality of signals received within the predetermined time interval is less than the predetermined number, the processor 420 may transmit, to the plurality of electronic devices, a first signal for setting a plurality of electronic devices to communicate with an external electronic device through the AP among the AP and the server. The processor 420 may transmit the first signal for setting the plurality of electronic devices to communicate with the external electronic device through the AP among the AP and the server, on a condition that the number of the plurality of signals received within the predetermined time interval is less than the predetermined number. For example, the processor 420 may transmit to a plurality of electronic devices the first signal for setting the plurality of electronic devices to communicate with the external electronic device through the AP among the AP and the server based on identifying that the number of the plurality of signals received within the predetermined time interval is less than the predetermined number.

The processor 420 may transmit the first signal for setting the plurality of electronic devices to communicate with the external electronic device through the AP of an AP or a server, respectively. In other words, the processor 420 may transmit the first signal for maintaining the state of the mode for the VPN in the inactive state in each of the plurality of electronic devices.

For example, the processor 420 may identify the AP as a second type of AP for users of an individual or a specific group based on that the number of the plurality of signals received within the predetermined time interval is less than the predetermined number. The processor 420 may transmit the first signal based on identifying the type of the AP as the second type. In other words, the processor 420 may transmit the first signal including information for indicating that the type of the AP is the second type.

According to an embodiment, it is to be noted that the external electronic device may not mean only a single device. The external electronic device may stand for a certain electronic device of a plurality of external electronic devices. Each of the plurality of electronic devices may communicate with different external electronic devices through the AP among the AP and the server.

In operation 640, when the number of the plurality of signals received within the predetermined time interval is greater than or equal to the predetermined number, the processor 420 may transmit to a plurality of electronic devices a second signal for setting the plurality of electronic devices to communicate with an external electronic device through both the AP and the server. On a condition that the number of the plurality of signals received within the predetermined time interval is equal to or greater than the predetermined number, the processor 420 may transmit to the plurality of electronic devices the second signal for setting the plurality of electronic devices to communicate with the external electronic device through both the AP and the server. Based on the identification that the number of the plurality of signals received within the predetermined time interval is equal to or greater than the predetermined number, the processor 420 may transmit to a plurality of electronic devices the second signal for setting the plurality of electronic devices to communicate with the external electronic device through both the AP and the server. In other words, the processor 420 may transmit the second signal for changing the state of the mode for the VPN from the inactive state to the active state in each of the plurality of electronic devices.

The processor 420 may identify whether the number of the plurality of signals received within the predetermined time interval is greater than or equal to the predetermined number. The processor 420 may transmit the second signal for setting the plurality of electronic devices to communicate with the external electronic device through both the AP and the server, respectively.

For example, the processor 420 may identify the AP as a first type of AP jointly used from a plurality of electronic devices of a number of unspecified users based on that the number of the plurality of signals received within the predetermined time interval is greater than or equal to the predetermined number. The processor 420 may transmit the second signal based on identifying the type of AP as the first type of AP. In other words, the processor 420 may transmit the second signal including information to indicate that the type of the AP is the first type.

According to an embodiment, the processor 420 may receive a plurality of third signals for a request for activating the VPN from each of the plurality of electronic devices based on transmitting the second signal. The processor 420 may set the plurality of electronic devices to communicate with the external electronic device through both the AP and the server based on receiving the plurality of third signals.

According to an embodiment, after a predetermined time interval has elapsed, the processor 420 may receive a signal obtained based at least in part on the location information of the second electronic device and the identification information of the AP, from the second electronic device distinct from the plurality of electronic devices for a first time period. After the predetermined time interval has elapsed, the processor 420 may transmit the second signal to the second electronic device, in response to receiving the signal obtained based at least in part on the location information of the second electronic device and the identification information of the AP, from the second electronic device distinct from the plurality of electronic devices for the first time period. For example, the processor 420 may bypass (or skip) identifying the number of the plurality of signals received for the first time period after the predetermined time interval has elapsed. In response to receiving the signal from the second electronic device, the processor 420 may transmit the second signal for setting the second electronic device to communicate with the external electronic device through both the AP and the server.

After a lapse of the first time period, which has been performed after the predetermined time interval has elapsed, the processor 420 may receive a signal obtained based at least in part on location information of the third electronic device and identification information of the AP, from the third electronic device distinct from the plurality of electronic devices and the second electronic device. The processor 420 may identify the start timing of the predetermined time interval after a lapse of the first time period based on receiving the signal obtained based at least in part on the location information of the third electronic device and the identification information of the AP, from the third electronic device distinct from the second electronic device and the plurality of electronic devices. For example, the processor 420 may identify the start timing of the predetermined time interval based on receiving the signal received from the third electronic device.

Figure 7:
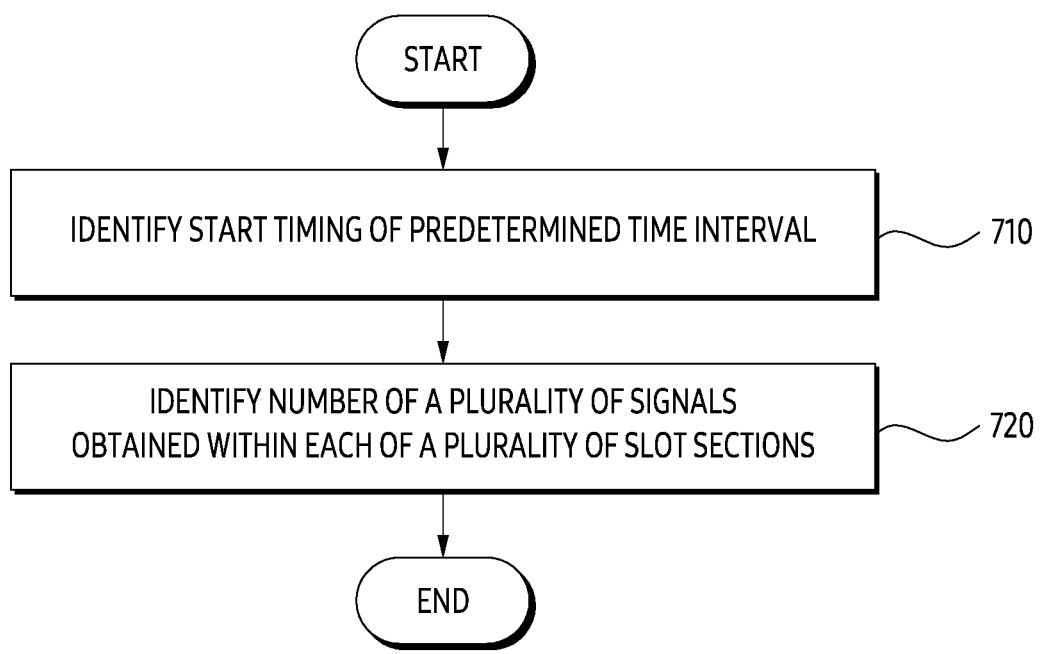
FIG. 7 is another flowchart illustrating an operation of a server according to various embodiments.

FIG. 7 is another flowchart illustrating an operation of a server according to various embodiments.

Figure 8A:
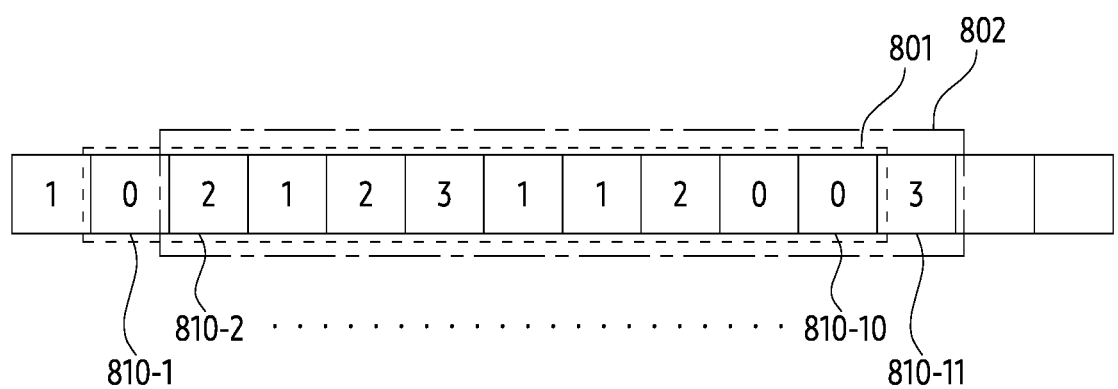
FIGS. 8A and 8B illustrate examples of operations of a server according to various embodiments.
Figure 8B:
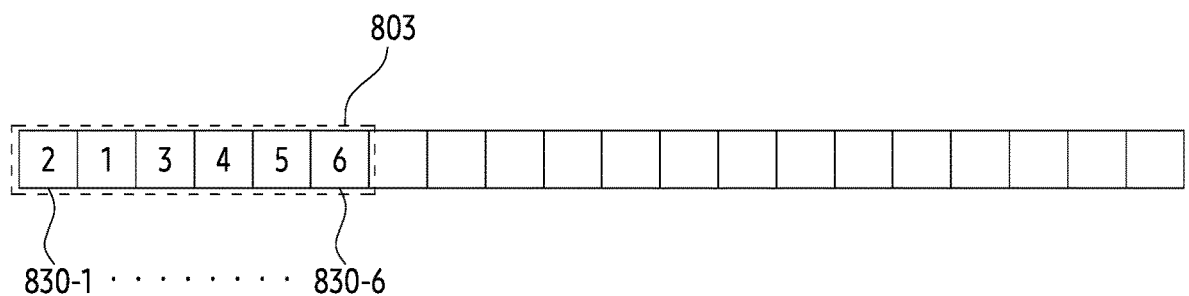

FIGS. 8A and 8B illustrate examples of operations of a server according to various embodiments.

This method may be executed by the server 204 and the processor 420 of the server 204 illustrated in FIGS. 4A and 4B. Operations 710 and 720 may be related to the operation 620 of FIG. 6.

Referring now to FIG. 7, in the operation 710, the processor 420 may identify a start timing of a predetermined time interval. The processor 420 may identify the start timing of the predetermined time interval based on obtaining the third signal that is first received among a plurality of signals.

The predetermined time interval may include a plurality of slot sections. The plurality of slot sections may be configured to be continuous. The predetermined time interval and the plurality of slot sections may be configured in various formats.

In the operation 720, the processor 420 may identify the number of the plurality of signals obtained within each of the plurality of slot sections. The processor 420 may identify the number of the plurality of signals obtained within each of the plurality of slot sections among a plurality of signals, for the plurality of slot sections from the start timing.

Referring then to FIG. 8A, for example, the predetermined time intervals 801 and 802 each may include 10 minutes. The predetermined time intervals 801 and 802 each may include 10 slot sections. One slot section may include 1 minute. The predetermined number may be set to be 20.

The predetermined time interval 801 may include a first slot interval 810-1 to a tenth slot interval 810-10. The processor 420 may identify the start timing of the predetermined time interval based on obtaining the third signal that is first received among a plurality of signals. The processor 420 may initiate identifying the number of the plurality of signals received in the first slot section 810-1 based on the start timing.

For example, the processor 420 may receive a third signal. The processor 420 may identify that no signal having the same hashing information (or digest) as that included in the third signal has been received. The processor 420 may identify the start timing of the predetermined time interval based on obtaining the third signal.

The processor 420 may identify the number of the plurality of signals obtained within the first slot section 810-1 to the tenth slot section 810-10, respectively. The processor 420 may identify the sum of signals obtained in the first slot section 810-1 to the tenth slot section 810-10 as the number of the plurality of signals received within the predetermined time interval 801. The processor 420 may identify whether the sum of the signals obtained in the first slot section 810-1 to the tenth slot section 810-10 is less than a predetermined number (e.g., 20). The processor 420 may transmit the first signal based on that the sum of the signals obtained in the first slot section 810-1 to the tenth slot section 810-10 is less than the predetermined number (e.g., 20). The processor 420 may transmit the second signal for setting a plurality of electronic devices to communicate with an external electronic device through both the AP and the server based on that the sum of the signals obtained in the first slot section 810-1 to the tenth slot section 810-10 is greater than or equal to the predetermined number (e.g., 20).

According to an embodiment, after the tenth slot section 810-10 has elapsed, the processor 420 may identify the number of the plurality of signals received in the eleventh slot section 810-11. In the eleventh slot section 810-11, the processor 420 may receive a fourth signal from the first electronic device. The processor 420 may identify the number of the plurality of signals obtained within the second slot section 910-2 to the eleventh slot section 810-11, respectively. The processor 420 may identify the sum of signals obtained in the second slot section 810-2 to the eleventh slot section 810-11 as the number of the plurality of signals received in the predetermined time interval 802. Based on the number of the plurality of signals received in the predetermined time interval 802, the processor 420 may transmit, to the first electronic device, the first signal for setting the plurality of electronic devices to communicate with the external electronic device through the AP among the AP and the server, and/or the second signal for setting the plurality of electronic devices to communicate with the external electronic device through both the AP and the server.

According to an embodiment, the processor 420 may increase the slot section and identify a moving average value of signals received within the predetermined time interval (e.g., for 10 slot sections). The processor 420 may identify the moving average value of the signals received within the predetermined time interval to prevent malfunction due to instantaneous increase or decrease of the received signals.

According to an embodiment, although not shown herein, the processor 420 may independently set a predetermined time interval based on hashing information included in the received signal.

For example, the processor 420 may identify, within a predetermined first time interval, a signal including the first hashing information, received from the first electronic device connected to the first AP. The processor 420 may identify a signal including the second hashing information, received from the second electronic device connected to the second AP, within a predetermined second time interval configured independently of the first time interval.

Referring to FIG. 8B, for example, a predetermined time interval 803 may include 10 minutes. The predetermined time interval 803 may include 10 slot sections. One slot section may include 1 minute. The predetermined number may be set to be 20.

The processor 420 may identify that the number of signals obtained in at least one consecutive slot of a plurality of slot sections in the predetermined time interval 830 is greater than or equal to the predetermined number, before the predetermined time interval 803 elapses. The processor 420 may transmit, to a plurality of electronic devices, the second signal to set the plurality of electronic devices to communicate with the external electronic device through both the AP and the server, before the predetermined time interval elapses, in response to identifying that the number of the signals obtained in at least one consecutive slot of the plurality of slot sections is greater than or equal to a predetermined number.

For example, the predetermined time interval 803 may include a first slot section 830-1 to a tenth slot section 830-10. The processor 420 may identify that the number of the signals obtained in the first slot section 830-1 to the sixth slot section 830-6 is greater than or equal to a predetermined number. The processor 420 may transmit the second signal to a plurality of electronic devices for setting the plurality of electronic devices to communicate with the external electronic device through both the AP and the server, before the predetermined time interval 803 elapses, in response to identifying that the number of the signals obtained in the first 830-1 to the sixth 830-6 slot sections is greater than or equal to the predetermined number.

As another example, the processor 420 may transmit to the plurality of electronic devices the second signal for setting the plurality of electronic devices to communicate with the external electronic device through both the AP and the server, before the predetermined time interval 803 elapses, in response to identifying that the number of the signals obtained in one slot section of a plurality of slot sections are greater than or equal to the predetermined number.

Figure 9A:
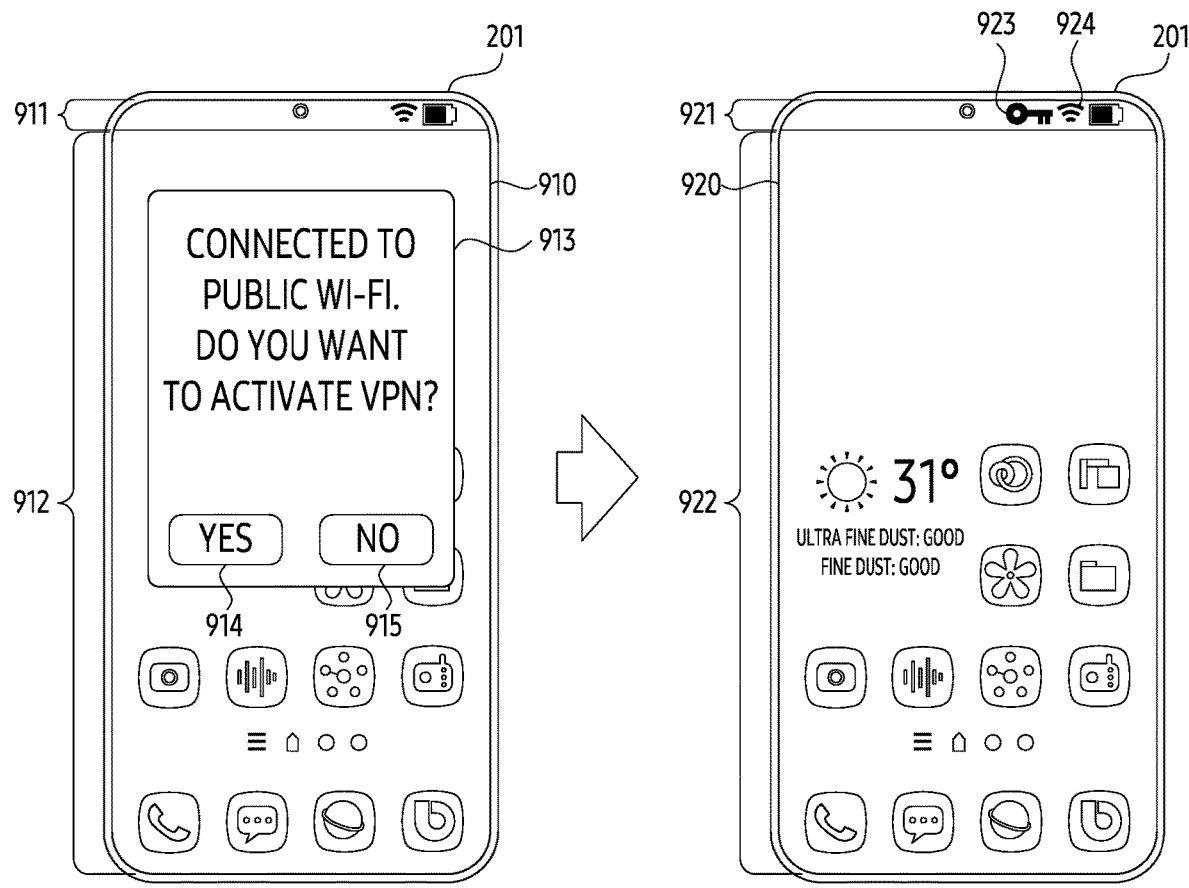
FIGS. 9A and 9B illustrate examples of operations of an electronic device according to various embodiments.
Figure 9B:
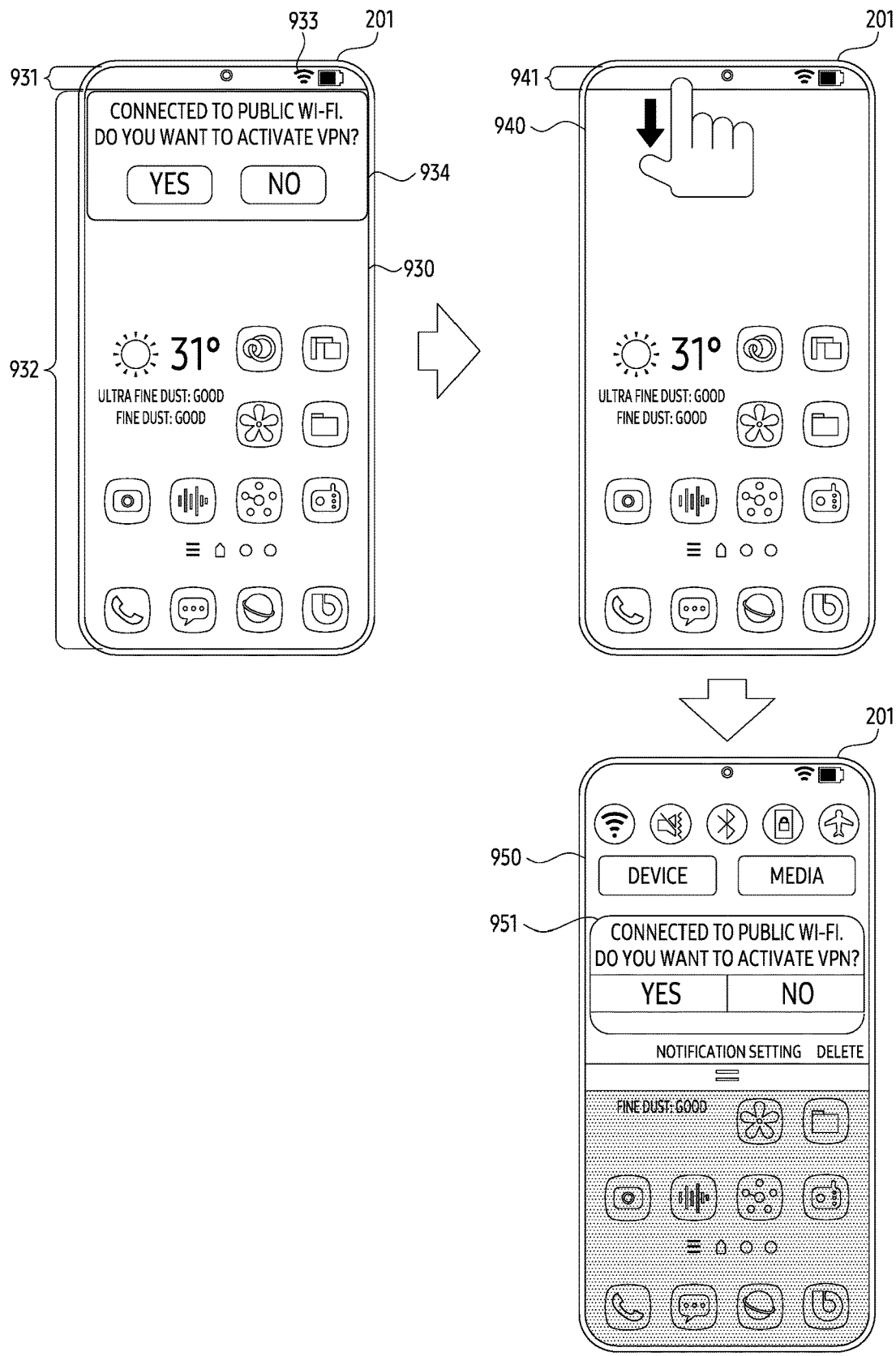

FIGS. 9A and 9B illustrate examples of operations of an electronic device according to various embodiments.

This method may be executed by the electronic device 201 and the processor 320 of the electronic device 201 shown in FIGS. 3A and 3B.

Referring to FIGS. 9A and 9B, the electronic device 201 may further include a display.

The processor 320 may receive a third signal received from the server, on a condition that the number of the plurality of signals received from the server within a predetermined time interval is greater than or equal to a predetermined number.

Based on the receiving of the third signal, the processor 320 may display a notification 913 including a first visual object 914 for changing a mode for VPN from an inactive state to an active state and a second visual object 915 for maintaining the mode for VPN in the inactive state, within a second area 912 of an area 911 or the area 912 on a screen 910. For example, the processor 320 may display the notification 913 as superimposed over a content being displayed within the area 912. In an embodiment, the notification 913 superimposed over the content may be configured to be moved based on a drag input from some area on the notification 913. For example, the notification 913 may include a text to indicate that a type of the AP to which the electronic device 201 is connected is a first type and another text asking the user of the electronic device 201 whether the mode for VPN is to be activated.

Based on a first user input to the first visual object 914, the processor 320 may change the state of the mode for the VPN from the inactive state to the active state.

Based on a second user input to the second visual object 915, the processor 320 may maintain the state of the mode for the VPN in the inactive state.

The processor 320 may switch the screen 910 to the screen 920 based on the first user input. The screen 920 may include an area 921 and an area 922. The area 921 may include at least one element for displaying the state of the electronic device 201. Based on changing the state of the mode for the VPN from the inactive state to the active state, the processor 320 may display an element 923 to indicate that the state of the mode for the VPN is the active state, together with an element 924 to indicate that the electronic device 201 is connected to the AP, within the area 921 for indicating a state of the electronic device 201.

According to an embodiment, the processor 320 may display the notification 913 in various ways through the display of the electronic device 201.

Referring to FIG. 9B, in response to establishing the connection with the first type of AP, the processor 320 may display a notification 934 together with an element 933 for indicating that the connection has been made to the AP, on a screen 930. The notification 934 may correspond to the notification 913 illustrated in FIG. 9A.

For example, the processor 320 may display the notification 934, overlapping the content being displayed in an area 932 adjacent to an area 931 (e.g., an indicator area) for displaying a state of the electronic device 201 in which the element 933 is displayed. The processor 320 may cease displaying the notification 934 overlapped on the area 932 after a lapse of a predetermined time period from the timing point when the display of the notification 934 was initiated. In other words, the processor 320 may remove the notification 934 from the area 932 after a lapse of the predetermined time period.

For example, after the predetermined time elapses, the processor 320 may display a screen 940 without the notification 934 being displayed thereon. While displaying the screen 940, the processor 320 may receive a user input (e.g., a swipe input or a drag input) to an area 941. For example, the user input may be a drag input from the area 941 toward the center of a display area of the display. For example, the user input may be a drag input in a direction perpendicular to one edge of the display of the electronic device 201 abutting on the area 941. For example, the user input may be a drag input in a direction perpendicular to one edge of the display adjacent to a front camera of the electronic device 201.

The processor 320 may display a screen 950 overlapped on the screen 940 in response to the user input. The screen 950 may be configured to be opaque. The processor 320 may display a notification 951 on the screen 950. The notification 951 may correspond to the notification 913 illustrated in FIG. 9A.

According to embodiments, although not illustrated in FIG. 9B, the notification 934 may be displayed overlapping on at least a portion of the area 932 and at least a portion of the area 931. For example, the notification 934 overlapping at least the portion of the area 932 and at least the portion of the area 931 may cover at least a portion of the element (e.g., element 933) displayed within the area 931. However, it is not limited thereto.

Figure 10:
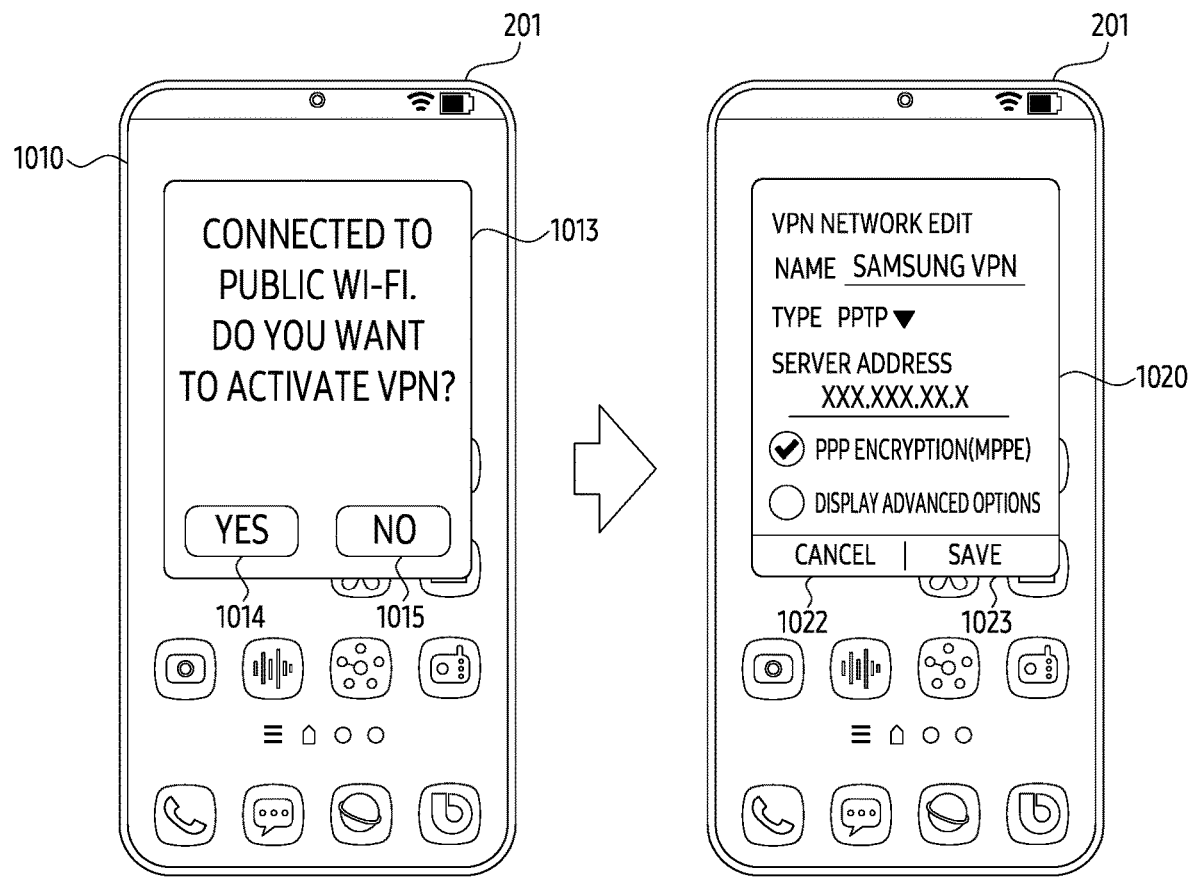
FIG. 10 illustrates another example of an operation of an electronic device according to various embodiments.

FIG. 10 illustrates another example of an operation of an electronic device according to various embodiments.

This method may be executed by the electronic device 201 and the processor 320 of the electronic device 201 shown in FIGS. 3A and 3B.

Referring to FIG. 10, the processor 320 may receive a third signal received from the server on a condition that the number of a plurality of signals received from the server is equal to or greater than a predetermined number within a predetermined time interval.

The processor 320 may receive configuration information for use in accessing the server, from the server together with the third signal. For example, the configuration information may include various information for use in VPN. For example, the configuration information may include at least one of VPN name, VPN type (e.g., point-to-point tunneling protocol (PPTP), layer 2 tunneling protocol (L2TP), internet protocol security (IPSec), or Internet key exchange version two (IKEv2)), server address, user name, and/or password.

Based on receiving the third signal, the processor 320 may display, overlapping on a screen 1010, a notification 1013 including a first visual object 1014 for changing a state of the mode for the VPN from an inactive state to an active state using the display of the electronic device 201, and a second visual object 1015 for maintaining the state of the mode for the VPN in the inactive state. The screen 1010 may correspond to the screen 910 of FIG. 9A.

The processor 320 may display a visual object 1020 for displaying the configuration information for accessing the server, in response to a first user input to the first visual object 1014. The processor 320 may display the visual object 1020 to which the configuration information for accessing the server is input based on the configuration information received from the server. The processor 320 may display an executable object 1023 for changing the state of the mode for the VPN to the active state and an executable object 1022 for maintaining the state of the mode for the VPN to the inactive state along with configuration information for accessing the server.

The processor 320 may receive a third user input for the executable object 1023 while the visual object 1020 is displayed. Based on receiving the third user input, the processor 320 may change the state of the mode for the VPN from the inactive state to the active state.

The processor 320 may communicate with an external electronic device through both the AP and the server after the state of the mode for the VPN is changed from the inactive state to the active state.

Meanwhile, while the visual object 1020 is displayed, the processor 320 may receive a fourth user input for the executable object 1022. Based on receiving the fourth user input, the processor 320 may maintain the state of the mode for the VPN in the inactive state.

Figure 11:
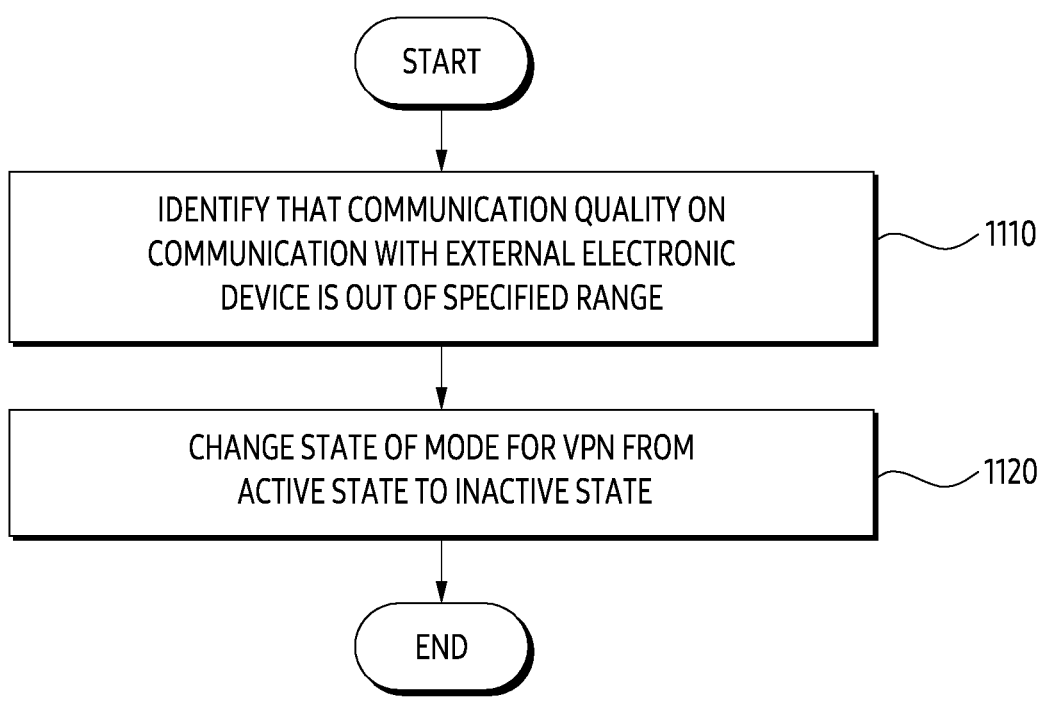
FIG. 11 illustrates another example of an operation of an electronic device according to various embodiments.

FIG. 11 illustrates another example of an operation of an electronic device according to various embodiments.

This method may be executed by the electronic device 201 and the processor 320 of the electronic device 201 shown in FIGS. 3A and 3B.

Referring to FIG. 11, in operation 1110, the processor 320 may identify that the communication quality on communication with the external electronic device (e.g., the external electronic device 204 of FIG. 2) is out of a specified range.

According to an embodiment, after the state of the mode for the VPN of the electronic device 201 is changed from the inactive state to the active state, the processor 320 may communicate with the external electronic device through both the AP (e.g., the AP 202 of FIG. 2) and the server 203 (e.g., the server 203 of FIG. 2).

While communicating with the external electronic device through both the AP and the server, the processor 320 may identify that the communication quality on communication with an external electronic device is out of a specified range. For example, the information collection unit 321 of the processor 320 may obtain the communication quality on communication with the external electronic device. The information calculation unit 322 of the processor 320 may identify that the communication quality on the communication with the external electronic device is out of the specified range.

For example, the communication quality may include at least one of latency, received signal strength indicator (RSSI), round trip time (RTT), and/or a signal-to-noise ratio (SNR). For example, the processor 320 may identify that the delay time is out of a specified range (or exceeds the specified value). As another example, the processor 320 may identify that the RSSI is out of a specified range (or less than the specified value). As another example, the processor 320 may identify that the SNR is out of a specified range (or less than the specified value). As still another example, the processor 320 may identify that the RTT is out of a specified range (or exceeds the specified value).

In operation 1120, the processor 320 may change the state of the mode for the VPN from the active state to the inactive state. Based on identifying that the communication quality is out of the specified range, the processor 320 may change the state of the mode for the VPN from the active state to the inactive state. For example, the network management unit 325 of the processor 320 may change the state of the mode for the VPN from the active state to the inactive state based on identifying that the communication quality related to the communication with the external electronic device is out of the specified range.

For example, when the state of the mode for the VPN operates as the active state, the server may be added to a path for the electronic device 201 to communicate with an external electronic device. When the server is added to the path, latency may increase. The processor 320 may identify that the latency exceeds a specified value. Based on identifying that the latency exceeds the specified value, the processor 320 may change the state of the mode for the VPN from the active state to the inactive state.

For another example, the processor 320 may identify that the SNR is less than a specified range (or a specified value). Even though the SNR is less than the specified range, when the state of the mode for the VPN operates as the active state, the latency may increase. The processor 320 may change the state of the mode for the VPN from the active state to the inactive state based on identifying that the SNR is less than the specified range.

Figure 12:
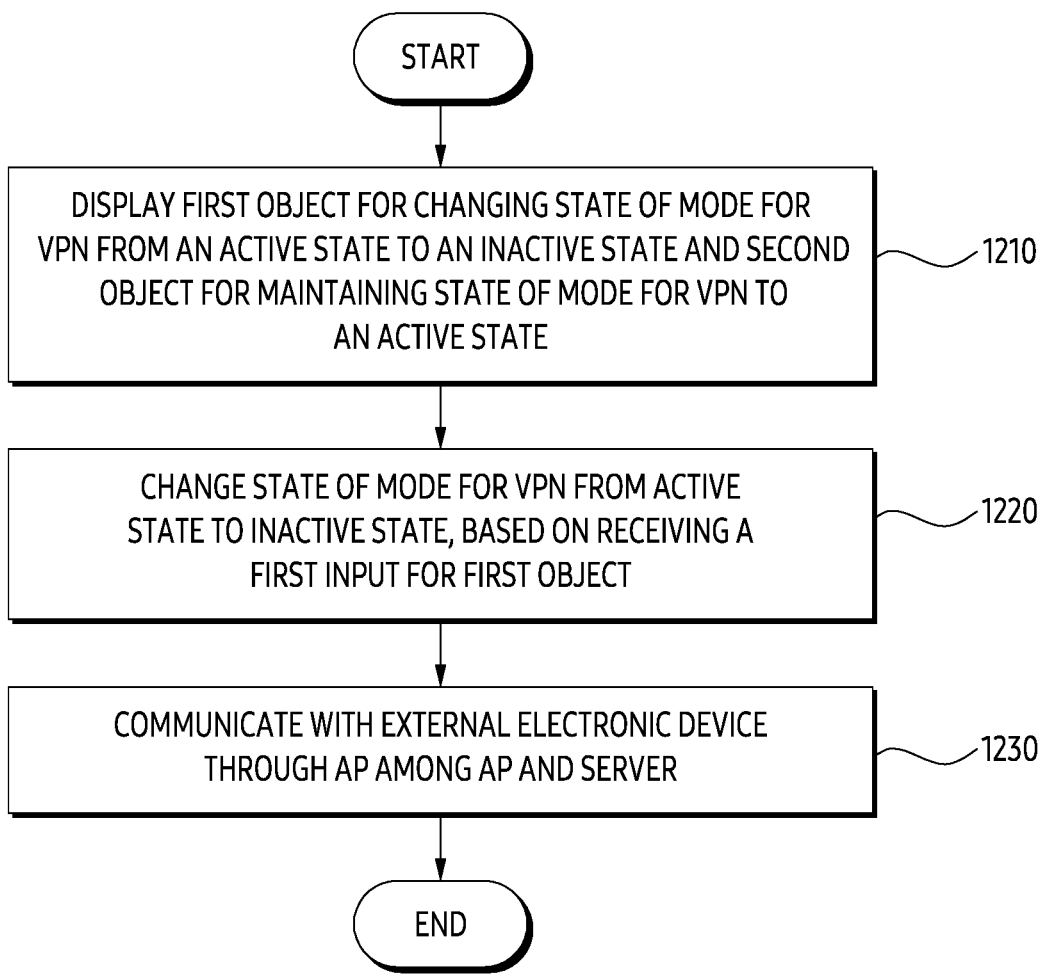
FIG. 12 is another flowchart illustrating an operation of an electronic device according to various embodiments.

FIG. 12 is another flowchart illustrating an operation of an electronic device according to various embodiments.

Figure 13:
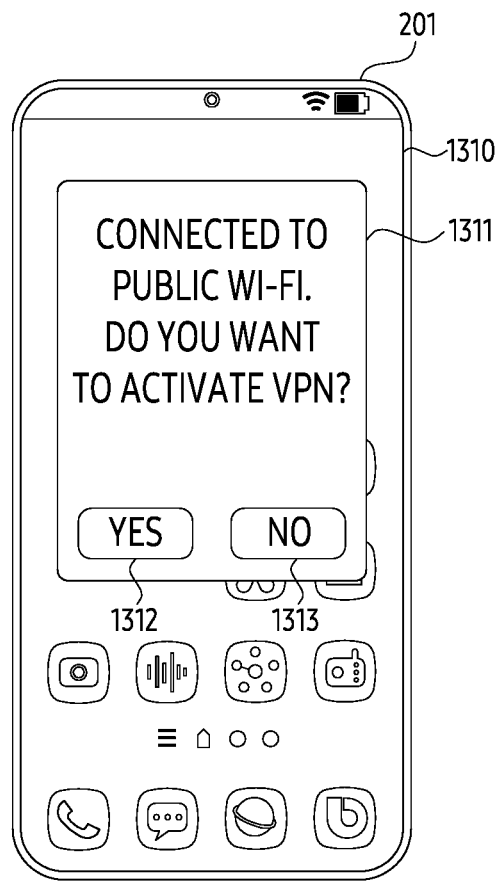
FIG. 13 illustrates an example of an operation of an electronic device according to various embodiments.

FIG. 13 illustrates another example of an operation of an electronic device according to various embodiments.

The methods described in FIGS. 12 and 13 may be executed by the electronic device 201 and the processor 320 of the electronic device 201 shown in FIGS. 3A and 3B.

Referring now to FIG. 12, operations 1210 to 1230 may correspond to the operation 112 of FIG. 11.

In operation 1210, the processor 320 may display a first object for changing the state of the mode for the VPN from the active state to the inactive state and a second object for maintaining the state of the mode for the VPN in the active state based on identifying that the communication quality on the communication with the external electronic device is out of the specified range.

In operation 1220, the processor 320 may change the state of the mode for the VPN from the active state to the inactive state based on receiving a first input for the first object.

In operation 1230, the processor 320 may communicate with the external electronic device through an AP among the AP and the server, in response to a change of the state of the mode for the VPN to the inactive state.

Referring then to FIG. 13, in the active state of the mode for the VPN, the processor 320 may identify that the communication quality on the communication with the external electronic device is out of the specified range. The processor 320 may display, overlapping on a screen 1310, a notification 1311 including a first object 1312 for changing the state of the mode for the VPN from the active state to the inactive state and a second object 1313 for maintaining the state of the mode for the VPN in the active state.

The processor 320 may change the state of the mode for the VPN from the active state to the inactive state based on receiving the first input to the first object 1312. The processor 320 may communicate with the external electronic device through the AP among the AP and the server, in response to a change of the state of the mode for the VPN to the inactive state.

Figure 14:
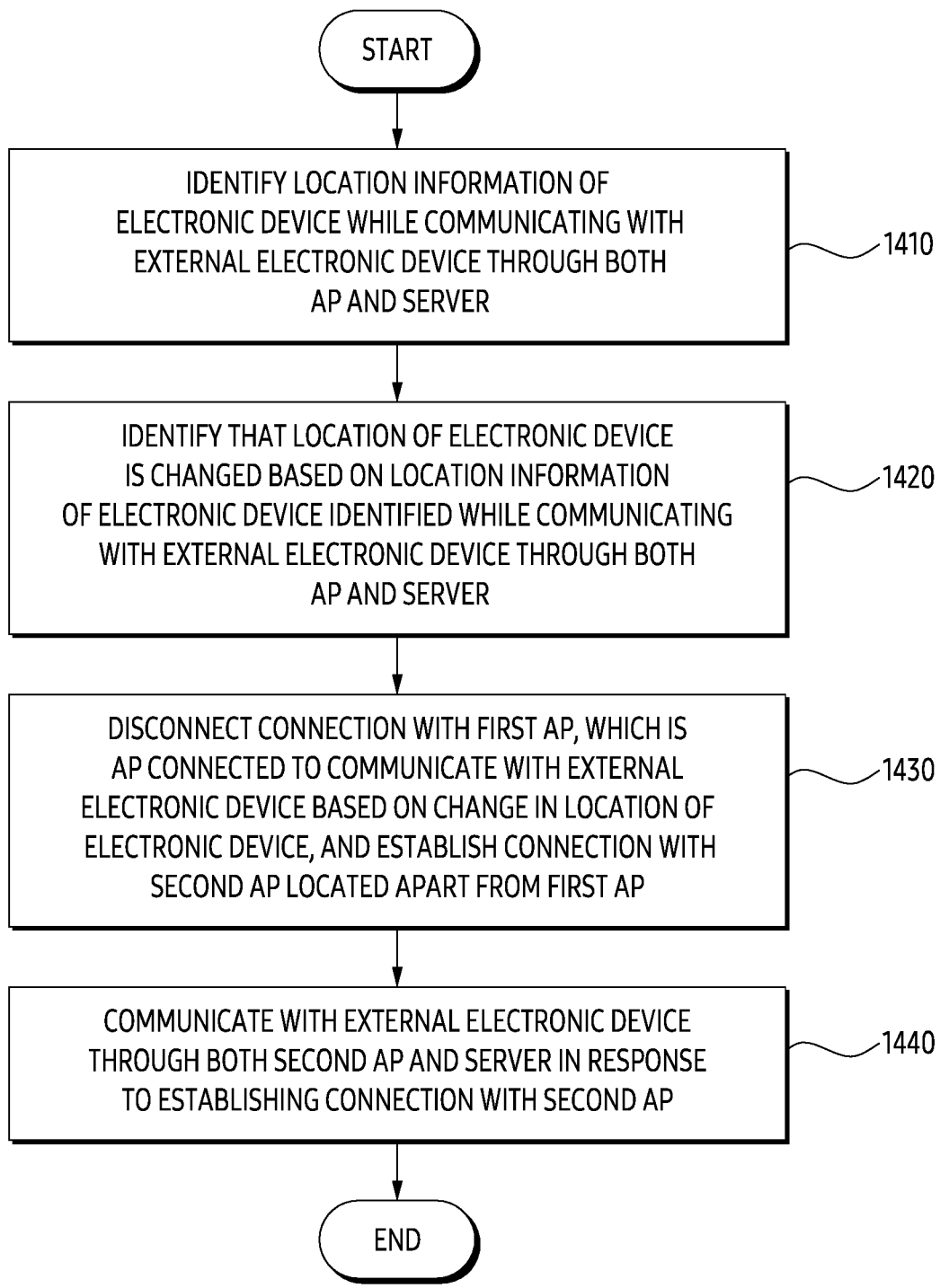
FIG. 14 is another flowchart illustrating an operation of an electronic device according to various embodiments.

FIG. 14 is another flowchart illustrating an operation of an electronic device according to various embodiments.

Figure 15:
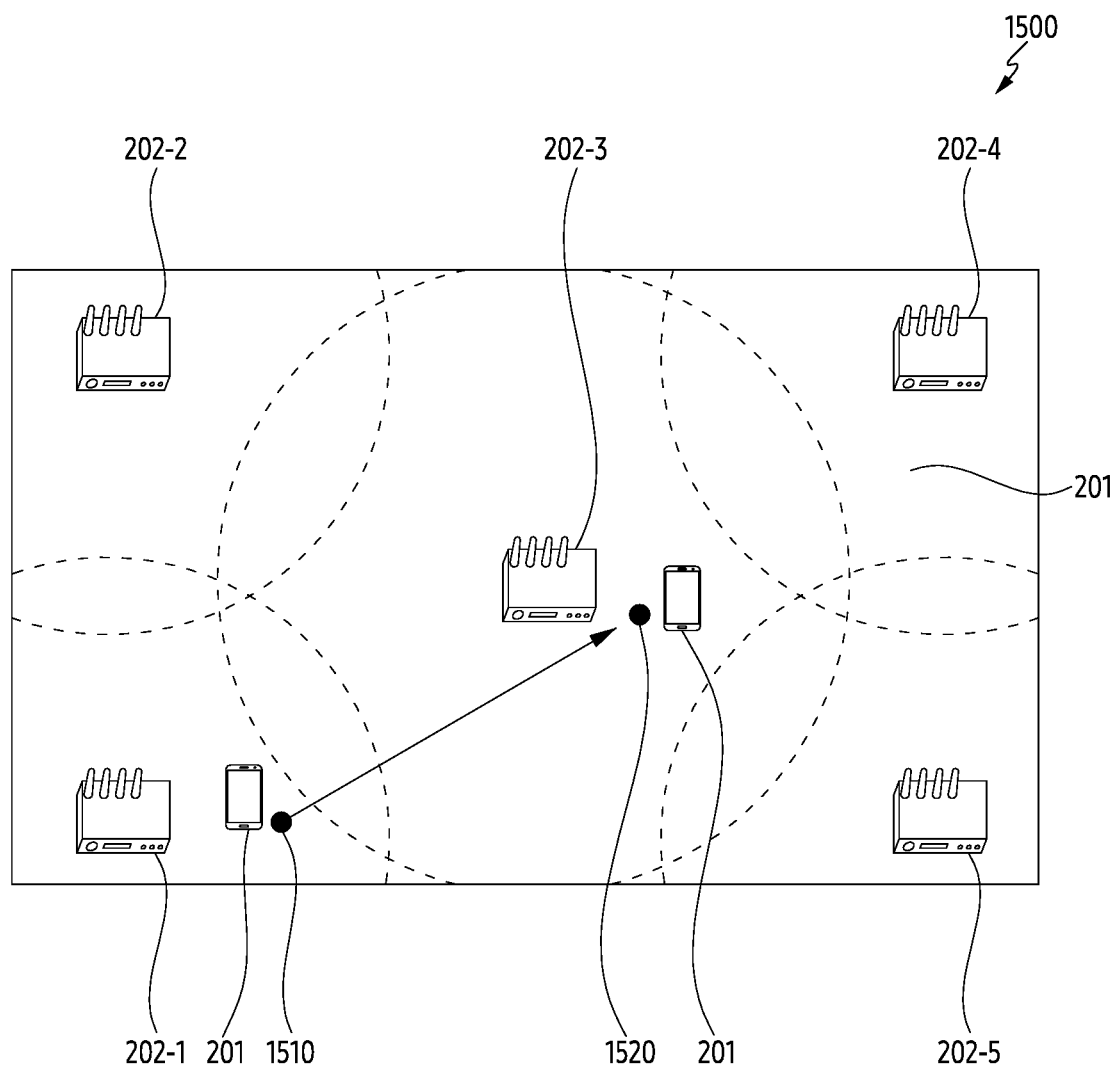
FIG. 15 illustrates another example of an operation of an electronic device according to various embodiments.

FIG. 15 illustrates another example of an operation of an electronic device according to various embodiments.

The methods described in FIGS. 14 and 15 may be executed by the electronic device 201 and the processor 320 of the electronic device 201 shown in FIGS. 3A and 3B.

Referring now to FIG. 14, in operation 1410, the processor 320 may identify the location information of the electronic device while communicating with the external electronic device (e.g., the external electronic device 204) through both the AP (e.g., the AP 202) and the server (e.g., the server 203).

In operation 1420, the processor 320 may identify that the location of the electronic device 201 is changed based on the location information of the electronic device 201 identified while communicating with the external electronic device through both the AP and the server.

In operation 1430, the processor 320 may disconnect connection with a first AP, which is an AP connected to communicate with the external electronic device based on the change in the location of the electronic device 201, and then establish connection with a second AP located apart from the first AP.

The processor 320 may identify whether the first AP and the second AP operate by the same service provider. For example, the processor 320 may identify whether the first AP and the second AP operate by the same service provider based on SSIDs of the first AP and the second AP.

In operation 1440, the processor 320 may communicate with the external electronic device through both the second AP and the server, in response to establishing the connection with the second AP.

Referring then to FIG. 15, the processor 320 may maintain the mode for VPN, in a situation where repetitive handovers are required within an environment 1500.

The environment 1500 may include a plurality of APs. The plurality of APs may include a first AP 202-1 to a fifth AP 202-5. The plurality of APs including the first APs 202-1 to the fifth APs 202-5 may operate by the same service provider. The plurality of APs may be located spaced apart from each other. For example, the plurality of APs are located at a distance apart from each other within a certain building or premises, and may provide a network environment in which the electronic device 201 can maintain communication with an external electronic device. The processor 320 of the electronic device 201 may communicate with the external electronic device through the first AP 202-1 at a first location 1510. The electronic device 201 may communicate with the external electronic device through a second AP 302-2 at a second location 1520. The electronic device 201 may move from the first location 1510 to the second location 1520. The processor 320 may perform a handover procedure from the first AP 202-1 to the third AP 202-3 based on moving from the first location 1510 to the second location 1520. Based on the movement of the electronic device 201 from the first location 1510 to the second location 1520, the processor 320 may disconnect the connection with the first AP 202-1 and then establish a connection with the third AP 202-3. The processor 320 may repeat disconnecting/establishing the connection based on the movement of the electronic device 201 within the environment 1500.

The processor 320 may identify the location information of the electronic device 201 while communicating with the external electronic device through both the first AP 202-1 and the server. The processor 320 may identify that the location of the electronic device 201 is changed based on the location information of the electronic device 201 identified while communicating with the external electronic device through both the first AP 202-1 and the server. The processor 320 may disconnect the connection with the first AP 202-1, which is an AP connected to communicate with the external electronic device, and then establish a connection with the third AP 202-3 spaced apart from the first AP 202-1 based on the change of the location of the electronic device 201 from the first location 1510 to the second location 1520. The processor 320 may communicate with the external electronic device through both the third AP 202-3 and the server, in response to establishing the connection with the third AP 202-3.

The processor 320 may bypass transmitting to the server a signal obtained based at least partially on the changed location information of the electronic device 201 and the identification information of the second AP 302-2 at the second location 1520. In other words, the processor 320 may not transmit to the server the signal obtained based at least partially on the changed location information of the electronic device 201 and the identification information of the second AP 302-2 at the second location 1520. In other words, instead of transmitting the signal obtained based at least partially on the changed location information of the electronic device 201 and the identification information of the second AP 302-2 at the second location 1520, the processor 320 may maintain the state of the mode for the VPN in the active state.

Figure 16:
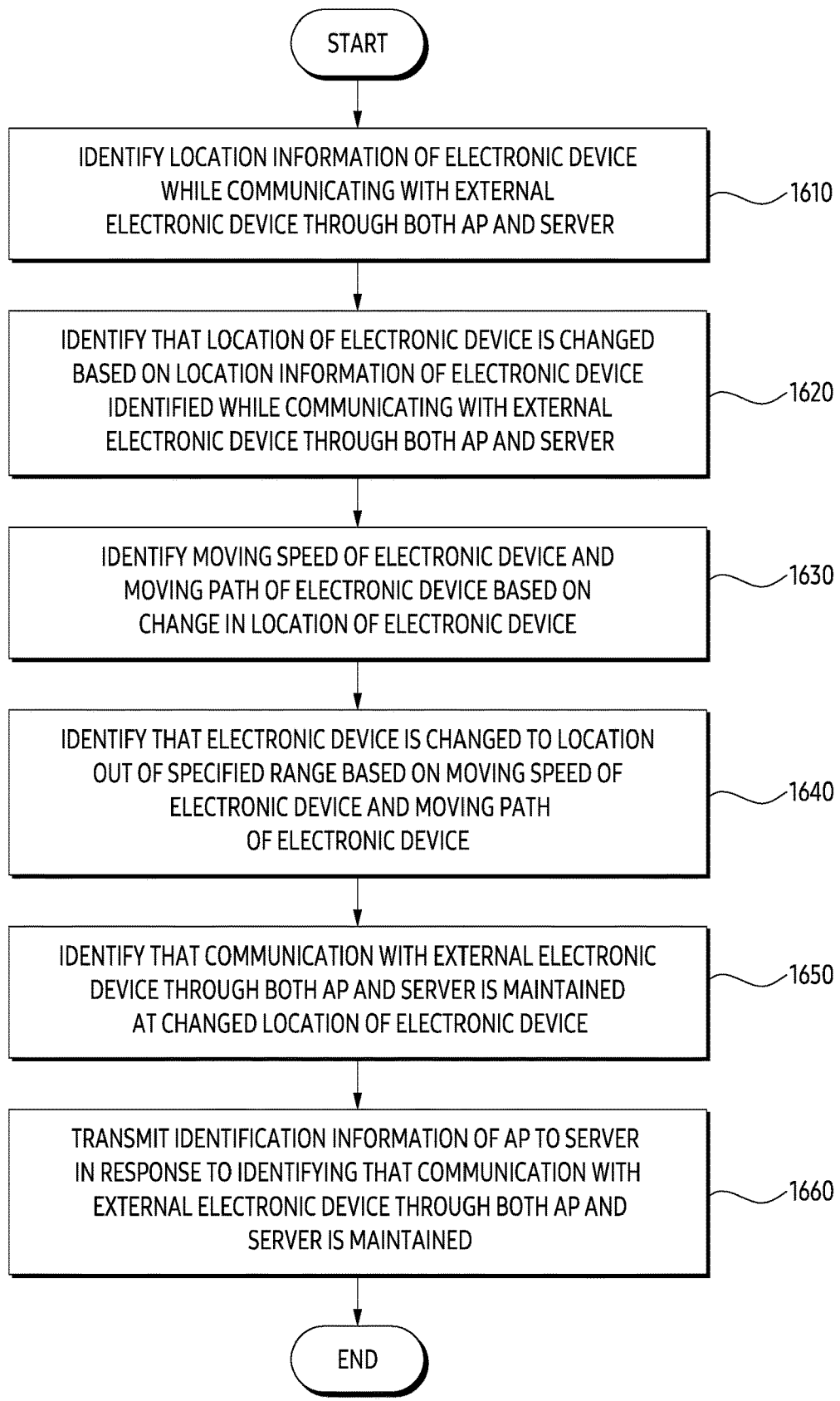
FIG. 16 is another flowchart illustrating an operation of an electronic device according to various embodiments.

FIG. 16 is another flowchart illustrating an operation of an electronic device according to various embodiments.

Figure 17:
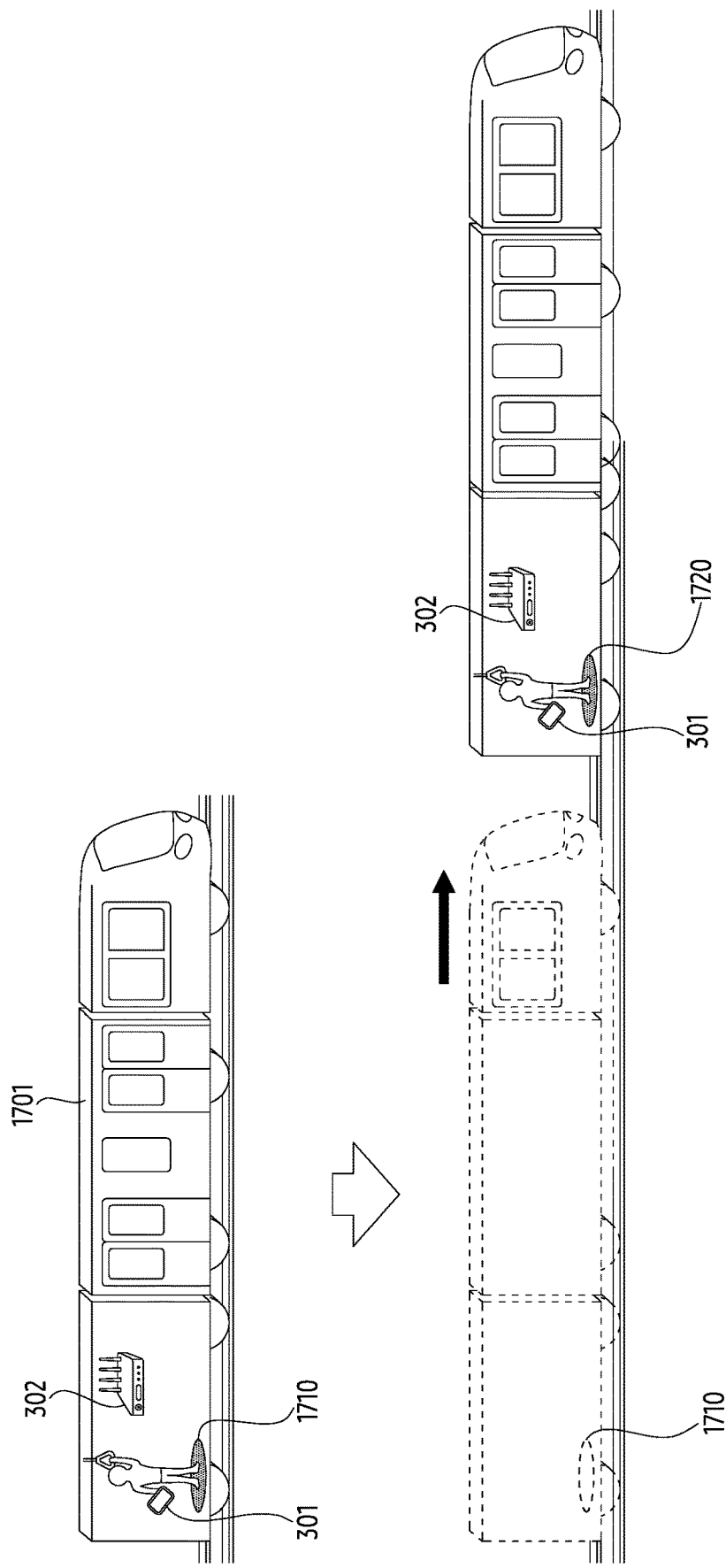
FIG. 17 illustrates another example of an operation of an electronic device according to various embodiments.

Further, FIG. 17 illustrates another example of an operation of an electronic device according to various embodiments.

The methods described in FIGS. 16 and 17 may be executed by the electronic device 201 and the processor 320 of the electronic device 201 shown in FIGS. 3A and 3B.

Referring now to FIG. 16, in operation 1610, the processor 320 may the identify location information of the electronic device 201 while communicating with the external electronic device (e.g., the external electronic device 204) through both the AP (e.g., AP 202) and the server (e.g., server 203).

In operation 1620, the processor 320 may identify that the location of the electronic device 201 is changed based on the location information of the electronic device 201 identified while communicating with the external electronic device through both the AP and the server.

In operation 1630, the processor 320 may identify a moving speed of the electronic device 201 and a moving path of the electronic device 201 based on a change in the location of the electronic device 201. For example, the electronic device 201 may move along with a movable device. The movable device may include the AP 202. The electronic device 201 may maintain the connection with the AP 202 even when its location is changed.

The processor 320 may identify the moving speed of the electronic device 201 and the moving path of the electronic device 201 based on the change in the location of the electronic device 201.

The processor 320 may identify the movable device based on the moving speed and the moving path of the electronic device 201. For example, the processor 320 may identify that the electronic device 201 is moving through a subway (metro), by means of comparing an average moving speed of the subway and the moving speed of the electronic device 201 and comparing a route of the subway and the moving path of the electronic device 201. As another example, the processor 320 may identify that the electronic device 201 is moving through a bus or any other public transportation, by means of comparing an average moving speed of the bus and the moving speed of the electronic device 201 and comparing a route of the bus and the moving path of the electronic device 201.

In operation 1640, the processor 320 may identify that the electronic device 201 is changed to a location out of a specified range based on the moving speed of the electronic device 201 and the moving path of the electronic device 201.

For example, the processor 320 may identify that the location information of the electronic device 201 obtained based on reference information is changed. The processor 320 may identify that the electronic device 201 is changed to a location out of the specified range based on the change in the location information of the electronic device 201.

In operation 1650, the processor 320 may identify that the communication with the external electronic device through both the AP and the server is maintained at the changed location of the electronic device 201.

Based on identifying that the communication with both the AP and the external electronic device through the server is maintained at the changed location of the electronic device 201, the processor 320 may identify that the AP is an AP operating in the movable device.

In operation 1660, the processor 320 may transmit the identification information of the AP to the server, in response to identifying that communication with the external electronic device through both the AP and the server is maintained.

The server may receive the identification information of the AP. The server may then identify that the AP is operating in the movable device based on the identification information of the AP.

Referring then to FIG. 17, the electronic device 201 may be located in the movable device 1701. In other words, the movable device 1701 may be boarded by the user of the electronic device 201. The movable device 1701 may include the AP 202. The AP 202 may be used jointly by a plurality of electronic devices of a number of unspecified users.

The processor 320 may establish a connection with the AP 202 at a first location 1710. The electronic device 201 may activate the mode for VPN based on establishing the connection with the AP 202. The electronic device 201 may communicate with an external electronic device through both the AP 202 and the server (not shown) at the first location 1710.

The location of the electronic device 201 may be changed based on the movement of the movable device 1701. The processor 320 may identify the location information of the electronic device 201 while communicating with the external electronic device through both the AP 202 and the server. Based on the location information of the electronic device 201, the processor 320 may identify that the location of the electronic device 201 is changed from the first location 1710 to a second location 1720.

The processor 320 may identify a moving speed of the electronic device 201 and a moving path of the electronic device 201 based on a change in the location of the electronic device 201. For example, the processor 320 may obtain a first location value (or first location coordinates) indicating the first location 1710 using a GPS receiver. The processor 320 may obtain a second location value (or second location coordinates) indicating the second location 1720 using the GPS receiver. The processor 320 may identify a time duration taken to move from the first location 1710 to the second location 1720. The processor 320 may identify the moving speed of the electronic device 201 and the moving path of the electronic device 201 based on the first location value, the second location value, and the time duration taken to move from the first location 1710 to the second location 1720.

The processor 320 may identify the movable device 1701 based on the moving speed and the moving path of the electronic device 201. For example, the processor 320 may compare the average moving speed of the subway with the moving speed of the electronic device 201, and compare the route of the subway and the moving path of the electronic device 201 to identify that the electronic device 201 is moving via the subway.

The processor 320 may identify that the location of the electronic device 201 is changed to a location out of the specified range based on the moving speed of the electronic device 201 and the moving path of the electronic device 201.

For example, the processor 320 may identify that the location of the electronic device 201 is changed to a location out of the specified range based on that first location information obtained based on the reference information in the first location 1710 is different from second location information obtained based on the reference information in the second location 1720.

The processor 320 may identify that the first location information obtained based on the reference information at the first location 1710 and the second location information obtained based on the reference information at the second location 1720 are different from each other based on the moving speed of the electronic device 201 and the moving path of the electronic device 201. Instead of acquiring the first location information and the second location information, the processor 320 may identify that the first location information and the second location information are different from each other based on the moving speed of the electronic device 201 and the moving path of the electronic device 201. The processor 320 may identify that the location of the electronic device 201 is changed to a location out of the specified range.

The processor 320 may identify that the communication with the external electronic device through both the AP 202 and the server is maintained at the second location 1720 to which the electronic device 201 is moved from the first location 1710. The processor 320 may identify that the communication with the external electronic device through both the AP 202 and the server is maintained even when the location of the electronic device 201 is changed from the first location 1710 to the second location 1720.

In response to identifying that the communication with the external electronic device through both the AP 202 and the server is maintained, the processor 320 may transmit to the server a signal obtained based on the identification information of the AP 202.

The processor 320 may transmit, to the server, a signal obtained based only on the identification information of the AP 202 other than the location information of the electronic device 201 based on the connection with the AP 202 included in the movable device 1701. The processor 320 may transmit information on the movable device 1701 to the server. The server may identify that the AP 202 is an AP mounted onto the movable device 1701 based on the signal and the information on the movable device 1701.

Figure 18:
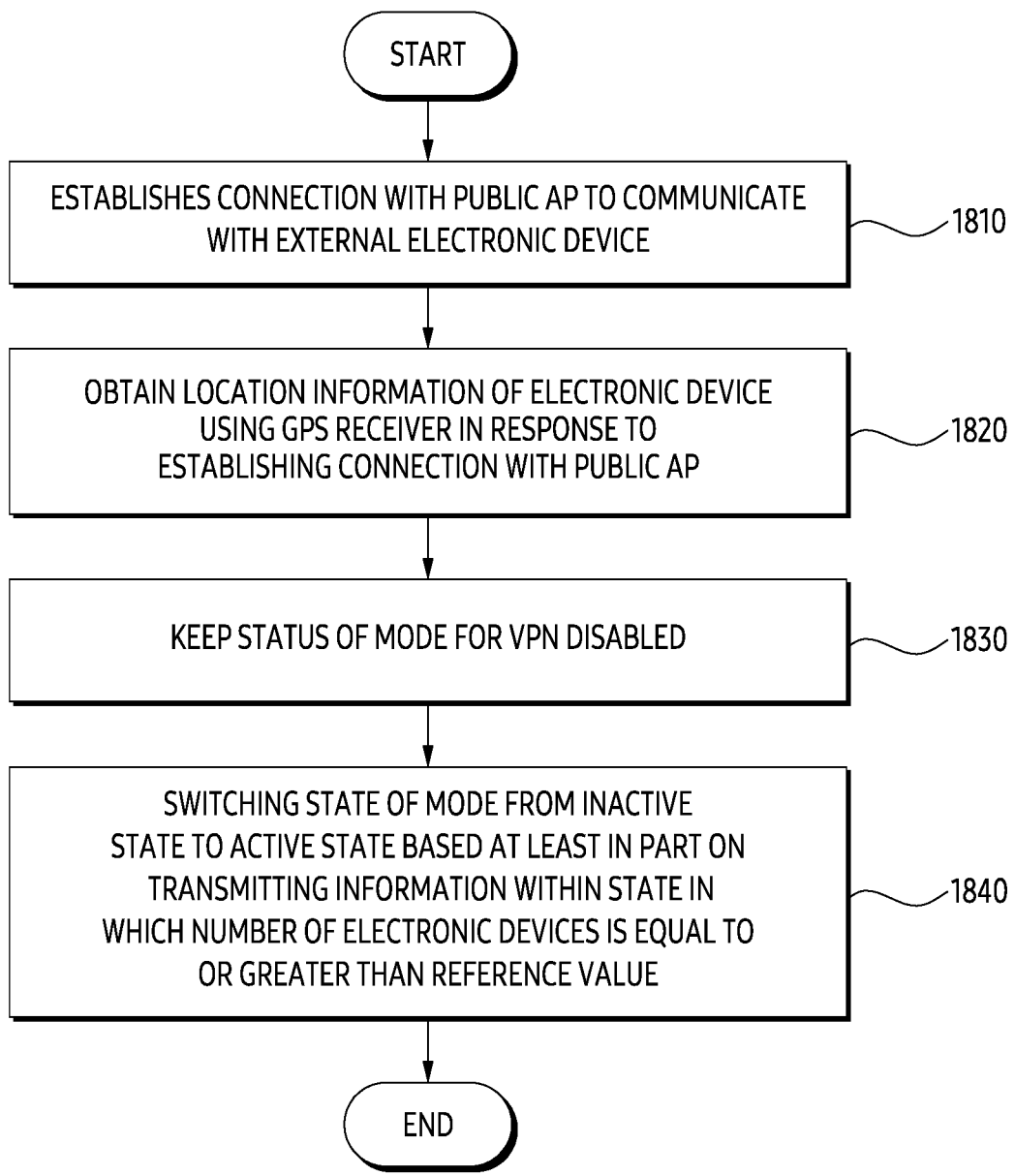
FIG. 18 is another flowchart illustrating an operation of an electronic device according to various embodiments.

FIG. 18 is another flowchart illustrating an operation of an electronic device according to various embodiments.

The method described in FIG. 18 may be executed by the electronic device 201 and the processor 320 of the electronic device 201 shown in FIGS. 3A and 3B.

Referring to FIG. 18, in operation 1810, the processor 320 may establish a connection with a public AP (e.g., AP 202) to communicate with an external electronic device (e.g., external electronic device 204). The public AP may be connected to a plurality of electronic devices used by a number of unspecified users. For example, the public AP may correspond to the AP 202 of FIG. 2.

In operation 1820, the processor 320 may obtain the location information of the electronic device 201 using the GPS receiver, in response to establishing the connection with the public AP.

In operation 1830, the processor 320 may maintain the state of the mode for the VPN in the inactive state. The processor 320 may maintain the state of the mode for the VPN in the inactive state based at least in part on transmitting information, distinct from the location information, obtained based at least in part on the location information, in a state in which the number of a plurality of electronic devices including the electronic device 201, located within a reference distance from the public AP, is less than a predetermined reference value.

The processor 320 may transmit the information distinct from the location information in a state in which the number of a plurality of electronic devices including the electronic device 201, located within the reference distance from the public AP, is less than the reference value. The information may be obtained based at least in part on the location information. The processor 320 may maintain the state of the mode for the VPN in the inactive state based at least in part on transmitting the information.

The processor 320 may change the state of the mode for the VPN from the inactive state to the active state based on that the number of the plurality of electronic devices is changed from a state that the number of the plurality of electronic devices is less than the reference value, to a state that the number of the plurality of electronic devices is equal to or more than the reference value, after the state of the mode for the VPN is maintained in the inactive state.

In operation 1840, the processor 320 may change the state of the mode for the VPN from the inactive state to the active state based at least in part on transmitting the information in a state that the number of the plurality of electronic devices is equal to or greater than the reference value. The processor 320 may communicate with the external electronic device through the public AP and the server for VPN (e.g., server 203) based on changing the state of the mode for the VPN from the inactive state to the active state. For example, the processor 320 may communicate with the external electronic device through both the public AP and the server for a VPN.

According to an embodiment, the electronic device 201 may further include a display. In response to a change of the state of the mode for the VPN from the inactive state to the active state, the processor 320 may display a visual object to indicate that the state of the mode for the VPN is activated using the display.

According to various embodiments, an electronic device may include a memory configured to store instructions, a global positioning system (GPS) receiver, at least one communication circuit, and a processor, wherein the processor may be, when executing the instructions, configured to establish connection with an access point (AP) using the at least one communication circuit, in response to establishing the connection with the AP, obtain location information of the electronic device using the GPS receiver, transmit, to a server for a virtual private network (VPN), a first signal obtained based at least in part on the location information of the electronic device and identification information of the AP using the at least one communication circuit, receive a second signal or a third signal from the server receiving a plurality of signals within predetermined time interval from each of the plurality of electronic devices including the electronic device, the plurality of signals including the first signal and being obtained respectively based at least in part on location information of each of the plurality of electronic devices and identification information of the AP, based on the receiving of the second signal, communicate with the external electronic device through the AP or the server, and based on the receiving of the third signal, communicate with the external electronic device through both the AP and the server based on the receiving of the third signal, wherein the second signal may be transmitted from the server to the electronic device on a condition that the number of the plurality of signals received by the server within a predetermined time interval is less than a predetermined number, and wherein the third signal bay be transmitted from the server to the electronic device on a condition that the number of the plurality of signals received by the server within the predetermined time interval is greater than the predetermined number.

According to an embodiment, the electronic device may further include a display, and the processor may be, when executing the instructions, configured to display based on receiving the third signal, a notification including a first visual object for changing a mode for VPN from an inactive state to an active state and a second visual object for maintaining the mode for VPN in the inactive state using the display based on a first user input for the first visual object, change the state of the mode for the VPN from the inactive state to the active state, and based on a second user input for the second visual object, maintain the state of the mode for the VPN in the inactive state.

According to an embodiment, the processor may, when executing the instructions, be configured to receive configuration information for accessing the server from the server with the third signal, in response to the first user input for the first visual object, display based on the configuration information, a screen for displaying the configuration information for accessing the server, while the screen is displayed, change, based on receiving a third user input, the state of the mode for the VPN from the inactive state to the active state, and communicate with the external electronic device through both the AP and the server.

According to an embodiment, the processor, when executing the instructions, may be configured to, after the mode for VPN is changed to the active state, display an element for representing that the state of the VPN mode is the active state in an area for indicating a state of the electronic device.

According to an embodiment, the processor, when executing the instructions, may be further configured to, while communicating with the external electronic device through both the AP and the server, identify that communication quality related to the communication with the external electronic device is out of a predetermined range, and based on identifying that the communication quality is out of the predetermined range, change the state of the mode for the VPN from the active state to the inactive state.

According to an embodiment, the communication quality may include latency, re received signal strength indicator (RSSI), and/or signal-to-noise ratio (SNR).

According to an embodiment, the processor may, when executing the instructions, be further configured to, based on identifying that the communication quality related to the communication with the external electronic device is out of the predetermined range, display, using the display, a first object for changing the state of the mode for the VPN from the active state to the inactive state and a second object for maintaining the state of the mode for the VPN in the active state, change, based on receiving the first input for the first object, the state of the mode for the VPN from the active state to the inactive state, and in response to a change of the state of the mode for the VPN to the inactive state, communicate with the external electronic device through the AP among the AP and the server.

According to an embodiment, the processor, when executing the instructions, may be further configured to obtain the first signal by hashing at least a portion of the location information of the electronic device and the identification information of the AP.

According to an embodiment, the identification information of the AP may be allocated to the AP and include a unique identifier (ID) to distinguish the AP from another AP.

According to an embodiment, the unique ID may include a service set identifier (SSID) of the AP and a basic service set identifier (BSSID) of the AP.

According to an embodiment, the processor, when executing the instructions, may be configured to obtain, from the server, reference information for obtaining the location information of the electronic device based on the reference information, obtain information on latitude of the electronic device included in the location information of the electronic device by changing data on a latitude value of the electronic device obtained using the GPS receiver, and based on the reference information, obtain information on longitude of the electronic device included in the location information of the electronic device, by changing data on a longitude value of the electronic device obtained using the GPS receiver.

According to an embodiment, at least part of information included in each of the plurality of signals may respectively correspond to at least part of information included in the first signal.

According to an embodiment, the processor, when executing the instructions, may be configured to, based on receiving of the third signal, obtain information related to a type of the AP, store, using the memory, the information related to the type of the AP, and in response to disconnection from the AP, change the state of the mode for the VPN from the active state to the inactive state.

According to an embodiment, the processor, when executing the instructions, may be configured to, in response to the connection with the AP, obtain the information related to the type of the AP from the memory, in response to obtaining the information related to the type of the AP, bypass transmitting the first signal, and change the state of the mode for the VPN from the inactive state to the active state.

According to an embodiment, the processor, when executing the instructions, may be further configured to, while communicating with the external electronic device through both the AP and the server, identify the location information of the electronic device based on the location information of the electronic device identified while communicating with the external electronic device through both the AP and the server, identify that the location of the electronic device is changed, after disconnecting from a first AP that is the AP connected to communicate with the external electronic device based on that the location of the electronic device is changed, establish a connection with a second AP separated from the first AP, and in response to establishing the connection with the second AP, communicate with the external electronic device through both the second AP and the server.

According to an embodiment, the processor, when executing the instructions, may be further configured to, while communicating with the external electronic device through both the AP and the server, identify the location information of the electronic device based on the location information of the electronic device identified while communicating with the external electronic device through both the AP and the server, identify that the location of the electronic device is changed based on a change of the location of the electronic device, identify a moving speed of the electronic device and a moving path of the electronic device based on the moving speed of the electronic device and the moving path of the electronic device, identify that the location of the electronic device is changed to a location outside a predetermined range, identify that communication with the external electronic device through both the AP and the server is maintained at the changed location of the electronic device, and in response to identifying that communication with the external electronic device through both the AP and the server is maintained, transmit the identification information of the AP to the server.

A server for a virtual private network (VPN) according to various embodiment, may include a memory configured to store instructions, a communication circuit, and a processor operably coupled to the communication circuit, wherein the processor, when executing the instructions, may be configured to receive, from each of a plurality of electronic devices, a plurality of signals obtained based at least in part on location information of each of the plurality of electronic devices and identification information of an access point (AP) in the plurality of electronic devices within a predetermined time interval based on identifying that the number of the plurality of signals received within the predetermined time interval is less than a predetermined number, transmit a first signal for setting the plurality of electronic devices to communicate with an external electronic device through the AP among the AP and the server to the plurality to electronic devices, and based on identifying that the number of the plurality of signals received within the predetermined time interval is greater than the predetermined number, transmit a second signal for setting the plurality of electronic devices to communicate with the external electronic device through both of the AP and the server to the plurality to electronic devices.

According to an embodiment, the predetermined time interval may include a plurality of slot intervals, and the processor, when executing the instructions, may be further configured to, based on obtaining third signal firstly received among the plurality of signals, identify a start timing of the predetermined time interval, and during the plurality of slot intervals from the start timing, identify the number of signals among the plurality of signals, obtained within each of the plurality of slot intervals.

According to an embodiment, the processor, when executing the instructions, may be further configured to, in response to identifying that the number of signals obtained within at least one continuous slot interval among the plurality of slot intervals is equal to or greater than a predetermined number, transmit the second signal for setting the plurality of electronic devices to communicate with the external electronic device through both of the AP and the server to the plurality to electronic devices before the predetermined time interval elapses.

According to an embodiment, the processor, when executing the instructions, may be further configured to, in response to a signal obtained for a first time interval after the predetermined time interval has elapsed, based at least in part on the location information of a second electronic device and the identification information of the AP from the second electronic device distinct to the plurality of electronic devices, transmit the second signal to the second electronic device.

According to an embodiment, the processor, when executing the instructions, may be further configured to, after a lapse of the first time interval, based on receiving a signal obtained based at least in part on the location information of a third electronic device and the identification information of the AP, from the third electronic device distinct from the plurality of electronic devices and the second electronic device, identify a start timing of the predetermined time interval after the first time interval has elapsed.

According to an embodiment, the processor, when executing the instructions, may be further configured to identify whether at least part of information included in the plurality of signals each obtained based at least in part on the location information of each of the plurality of electronic device and the identification information of the AP, within the predetermined time interval, correspond with each other, and based on that the at least part of information included in the plurality of signals correspond with each other, identify the number of signals received within the predetermined time interval.

According to an embodiment, the processor, when executing the instructions, may be further configured to, based on transmitting the second signal, receive a plurality of third signals for a request to activate a mode for the VPN from each of the plurality of electronic devices, and based on receiving the plurality of third signals, communicate with an external electronic device through both the AP and the server.

An electronic device according to various embodiments may further include a memory configured to store instructions, a global positioning system (GPS) receiver, at least one communication circuit, and a processor operatively coupled to the memory and the communication circuit, wherein the processor, when executing the instructions, may be configured to establish a connection with a public access point (AP) for communicating with an external electronic device, in response to establishing the connection with the public AP, obtain, using the GPS receiver, location information of the electronic device, maintain a state of mode for the VPN in an inactive state based at least in part on transmitting information obtained based at least in part on the location information and distinct from the location information, in a state in which the number of a plurality of electronic devices including the electronic device, located within a reference distance from the public AP is less than a reference value, and change the state of mode for the VPN from the inactive state to an active state based at least in part on transmitting the information in a state in which the number of the plurality of electronic devices is equal to or greater than the reference value.

According to an embodiment, the processor, when executing the instructions, may be further configured to communicate with the external electronic device through the public AP and the server for VPN based on changing the state of the mode for the VPN from the inactive state to the active state.

According to an embodiment, the processor may be, when executing the instructions, further configured to after the state of the mode for the VPN is maintained in the inactive state, in a state in which the number of the plurality of electronic devices is less than the reference value, change the state of the mode for the VPN from the inactive state to the active state based on that the number of the plurality of electronic devices is changed to the reference value or more.

According to an embodiment, the electronic device may further include a display, and the processor may, when executing the instructions, be further configured to display a visual object to indicate that the state of the mode for the VPN is activated, using the display, in response to a change of the state of the mode for the VPN from the inactive state to the active state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to,", "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a memory configured to store instructions;
a global positioning system (GPS) receiver;
at least one communication circuit; and
a processor, wherein the processor, when executing the instructions, is configured to:
establish connection with an access point (AP) using the at least one communication circuit;
obtain location information of the electronic device using the GPS receiver in response to establishing the connection with the AP;
transmit, to a server for a virtual private network (VPN), a first signal obtained based at least in part on the location information of the electronic device and identification information of the AP;
receive a second signal or a third signal from the server receiving a plurality of signals within a predetermined time interval from each of a plurality of electronic devices including the electronic device, wherein the plurality of signals includes the first signal and is obtained respectively based at least in part on the location information of each of the plurality of electronic devices and the identification information of the AP;
communicate with the external electronic device through the AP among the AP and the server based on receiving of the second signal; and
communicate with the external electronic device through both the AP and the server based on receiving of the third signal;
wherein the second signal is transmitted from the server to the electronic device on a condition that a number of the plurality of signals received by the server within the predetermined time interval is less than a predetermined number;
wherein the third signal is transmitted from the server to the electronic device on a condition that the number of the plurality of signals received by the server within the predetermined time interval is greater than the predetermined number.

2. The electronic device according to claim 1,
wherein the electronic device further comprises a display, and
wherein the processor, when executing the instructions, is configured to:
display a notification including a first visual object for changing a mode for the VPN from an inactive state to an active state and a second visual object for maintaining the mode for the VPN in the inactive state based on the receiving of the third signal;
change the state of mode for the VPN from the inactive state to the active state based on a first user input for the first visual object; and
maintain the state of mode for the VPN in the inactive state based on a second user input for the second visual object.

3. The electronic device according to claim 2,
wherein the processor, when executing the instructions, is configured to:
receive, from the server, configuration information for accessing the server along with the third signal;
display a screen for displaying the configuration information for accessing the server based on the configuration information in response to the first user input for the first visual object;
change the state of the mode for the VPN from the inactive state to the active state while the screen is displayed based on receiving a third user input; and
communicate with the external electronic device through both the AP and the server.

4. The electronic device according to claim 3, wherein the processor, when executing the instructions, is configured to:
display an element to indicate that the state of the VPN mode is the active state after the mode for VPN is changed to the active state in an area for indicating a state of the electronic device.

5. The electronic device according to claim 2, wherein the processor, when executing the instructions, is further configured to:
identify that communication quality related to the communication with the external electronic device is out of a predetermined range while communicating with the external electronic device through both the AP and the server; and
change the state of the mode for the VPN from the active state to the inactive state based on identifying that the communication quality is out of the predetermined range.

6. The electronic device according to claim 5, wherein the processor, when executing the instructions, is further configured to:
display, using the display, a first object for changing the state of the mode for the VPN from the active state to the inactive state and a second object for maintaining the state of the mode for the VPN in the active state based on identifying that the communication quality on the communication with the external electronic device is out of the predetermined range;
change the state of the mode for the VPN from the active state to the inactive state based on receiving a first input for the first object; and
communicate with the external electronic device through the AP or the server in response to a change of the state of the mode for the VPN to the inactive state.

7. The electronic device according to claim 1, wherein the processor, when executing the instructions, is further configured to:
obtain the first signal by hashing at least part of the location information of the electronic device and the identification information of the AP.

8. The electronic device according to claim 1, wherein the processor, when executing the instructions, is configured to:
obtain, from the server, reference information for obtaining the location information of the electronic device;
obtain information on latitude of the electronic device included in the location information of the electronic device based on the reference information by changing data on a latitude value of the electronic device obtained using the GPS receiver; and
obtain information on longitude of the electronic device included in the location information of the electronic device based on the reference information by changing data on a longitude value of the electronic device obtained using the GPS receiver.

9. The electronic device according to claim 1, wherein the at least part of information included in each of the plurality of signals respectively corresponds to at least part of information included in the first signal.

10. The electronic device according to claim 1, wherein the processor, when executing the instructions, is configured to:
  obtain information related to a type of the AP based on receiving the third signal;
  store, using the memory, the information related to the type of the AP; and
  change the state of the mode for the VPN from the active state to the inactive state in response to a disconnection from the AP.

11. The electronic device according to claim 10, wherein the processor, when executing the instructions, is configured to:
  obtain the information related to the type of the AP from the memory in response to the connection with the AP;
  bypass transmitting the first signal in response to obtaining the information related to the type of the AP; and
  change the state of the mode for the VPN from the inactive state to the active state.

12. The electronic device according to claim 1, wherein the processor, when executing the instructions, is further configured to:
  identify the location information of the electronic device while communicating with the external electronic device through both the AP and the server;
  identify that the location of the electronic device is changed based on the location information of the electronic device identified while communicating with the external electronic device through both the AP and the server;
  establish a connection with a second AP spaced apart from the first AP after disconnecting from a first AP that is the AP connected to communicate with the external electronic device based on that the location of the electronic device is changed; and
  communicate with the external electronic device through both the second AP and the server in response to establishing the connection with the second AP.

13. The electronic device according to claim 1, wherein the processor, when executing the instructions, is further configured to:
  identify the location information of the electronic device while communicating with the external electronic device through both the AP and the server;
  identify that the location of the electronic device is changed based on the location information of the electronic device identified while communicating with the external electronic device through both the AP and the server;
  identify a moving speed of the electronic device and a moving path of the electronic device based on a change in the location of the electronic device;
  identify that the location of the electronic device is changed to a location out of a predetermined range based on the moving speed of the electronic device and the moving path of the electronic device;
  identify that communication with the external electronic device through both the AP and the server is maintained at the changed location of the electronic device; and
  in response to identifying that communication with the external electronic device through both the AP and the server is maintained, transmit the identification information of the AP to the server.

14. A server for a virtual private network (VPN) comprising:
  a memory configured to store instructions;
  a communication circuit; and
  a processor operably coupled to the communication circuit, wherein the processor, when executing the instructions, is configured to:
    receive, from each of a plurality of electronic devices, a plurality of signals obtained based at least in part on location information of each of the plurality of electronic devices and identification information of an access point (AP) in the plurality of electronic devices within a predetermined time interval;
    transmit a first signal for setting the plurality of electronic devices to communicate with an external electronic device through the AP or the server to the plurality to electronic devices based on identifying that the number of the plurality of signals received within the predetermined time interval is less than a predetermined number; and
    transmit a second signal for setting the plurality of electronic devices to communicate with an external electronic device through both of the AP and the server to the plurality to electronic devices based on identifying that the number of the plurality of signals received within the predetermined time interval is greater than the predetermined number.

15. The server according to claim 14, wherein the predetermined time interval includes a plurality of slot intervals, and
  wherein the processor, when executing the instructions, is further configured to:
    identify a start timing of the predetermined time interval based on obtaining a third signal firstly received among the plurality of signals; and
    identify the number of the plurality of signals obtained within each of the plurality of slot intervals among the plurality of signals during the plurality of slot intervals from the start timing.

16. The server according to claim 15, wherein the processor, when executing the instructions, is further configured to:
  transmit the second signal for setting the plurality of electronic devices to communicate with the external electronic device through both of the AP and the server to the plurality to electronic devices before the predetermined time interval elapses in response to identifying that the number of signals obtained within at least one continuous slot interval, among the plurality of slot intervals, is equal to or greater than the predetermined number.

17. The server according to claim 15, wherein the processor, when executing the instructions, is further configured to:
  transmit the second signal to the second electronic device in response to a signal obtained, for a first time interval after the predetermined time interval has elapsed, based at least in part on the location information of a second electronic device and the identification information of the AP from the second electronic device distinct from the plurality of electronic devices.

18. The server according to claim 14, wherein the processor, when executing the instructions, is further configured to:
  identify whether at least part of information included in the plurality of signals each obtained based at least in part on the location information of each of the plurality of electronic device and the identification information of the AP correspond with each other within the predetermined time interval; and identify the number of signals received within the predetermined time interval based on that the at least part of information included in the plurality of signals correspond with each other.

19. The server according to claim 14, wherein the processor, when executing the instructions, is further configured to:
- receive a plurality of third signals for a request to activate a mode for the VPN from each of the plurality of electronic devices based on transmitting the second signal; and
- communicate with an external electronic device through both the AP and the server based on receiving the plurality of third signals.

20. An electronic device comprising:
- a memory configured to store instructions;
- a global positioning system (GPS) receiver;
- at least one communication circuit; and
- a processor operatively coupled to the memory and the communication circuit, wherein the processor, when executing the instructions, is configured to:
  - establish a connection with a public access point (AP) for communicating with an external electronic device;
  - obtain location information of the electronic device using the GPS receiver in response to establishing the connection with the public AP;
  - maintain a state of mode for the VPN in an inactive state based at least in part on transmitting information obtained based at least in part on the location information and distinct from the location information, in a state in which the number of a plurality of electronic devices including the electronic device, located within a reference distance from the public AP, is less than a reference value; and
  - change the state of mode for the VPN from the inactive state to an active state based at least in part on transmitting the information in a state in which the number of the plurality of electronic devices is equal to or greater than the reference value.

* * * * *